(12) United States Patent
Ben-Nun et al.

(10) Patent No.: US 10,178,181 B2
(45) Date of Patent: Jan. 8, 2019

(54) INTERPOSER WITH SECURITY ASSISTANT KEY ESCROW

(71) Applicant: Cisco Technology, Inc., San Jose, CA (US)

(72) Inventors: Eitan Ben-Nun, San Jose, CA (US); Michael Zayats, Sunnyvale, CA (US); Daniel G. Wing, San Jose, CA (US); Kirtesh Patil, Milpitas, CA (US); Jaideep Padhye, Fremont, CA (US); Manohar B. Hungund, Santa Clara, CA (US); Saravanan Agasaveeran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 14/328,094

(22) Filed: Jul. 10, 2014

(65) Prior Publication Data

US 2015/0288679 A1 Oct. 8, 2015

Related U.S. Application Data

(60) Provisional application No. 61/974,131, filed on Apr. 2, 2014.

(51) Int. Cl.
*H04L 29/06* (2006.01)
*H04L 29/08* (2006.01)

(52) U.S. Cl.
CPC ........ *H04L 67/141* (2013.01); *H04L 63/0281* (2013.01); *H04L 63/0823* (2013.01); *H04L 63/168* (2013.01); *H04L 67/28* (2013.01)

(58) Field of Classification Search
None
See application file for complete search history.

(56) References Cited

U.S. PATENT DOCUMENTS

| 6,058,188 A * | 5/2000 | Chandersekaran ... H04L 9/0894 380/286 |
| 6,907,530 B2 * | 6/2005 | Wang .................. H04L 63/0428 709/224 |

(Continued)

OTHER PUBLICATIONS

Bhargavan et al., Triple Handshakes and Cookies Cutters: Breaking and Fixing Authentication over TLS, IEEE 2014, 16 pages (Year: 2014).*

(Continued)

*Primary Examiner* — Jeffrey C Pwu
*Assistant Examiner* — Baotram Tran
(74) *Attorney, Agent, or Firm* — Edell, Shapiro & Finnan, LLC

(57) ABSTRACT

An interposer is provided that is configured to interpose into an application security protocol exchange by obtaining application session security state. The interposer does this without holding any private keying material of client or server. An out-of-band Security Assistant Key Escrow service (SAS/SAKE) is also provided. The SAKE resides in the secure physical network perimeter and holds the private keying material required to derive session keys for interposing into application security protocol. During a security protocol handshake, the interposer sends SAKE security protocol handshake messages and in return receives from the SAKE session security state that allows it to participate in application security protocol.

19 Claims, 20 Drawing Sheets

(56) References Cited

U.S. PATENT DOCUMENTS

| | | | | |
|---|---|---|---|---|
| 7,055,027 B1* | 5/2006 | Gunter | ............... | H04L 63/0428 709/223 |
| 7,188,253 B2 | 3/2007 | Halasz et al. | | |
| 7,954,144 B1* | 5/2011 | Ebrahimi | ............. | H04L 63/102 709/227 |
| 8,316,237 B1* | 11/2012 | Felsher | ............... | H04L 9/0825 380/282 |
| 8,621,208 B1* | 12/2013 | Hu | ....................... | H04L 63/045 705/51 |
| 8,738,902 B2* | 5/2014 | Yoo | .................... | H04L 63/0823 713/151 |
| 9,172,679 B1* | 10/2015 | Geddes | ............... | H04L 63/0281 |
| 2003/0046533 A1* | 3/2003 | Olkin | .................... | H04L 51/30 713/152 |
| 2003/0105810 A1* | 6/2003 | McCrory | ................ | H04L 29/06 709/203 |
| 2004/0151323 A1* | 8/2004 | Olkin | .................. | G06Q 20/401 380/280 |
| 2004/0235563 A1* | 11/2004 | Blackburn | ............. | G07F 17/32 463/29 |
| 2006/0286967 A1* | 12/2006 | Lee | ....................... | H04M 3/38 455/411 |
| 2009/0025078 A1* | 1/2009 | Kuehr-McLaren | ....................... | H04L 63/166 726/14 |
| 2009/0119504 A1* | 5/2009 | van Os | ................ | H04L 9/3271 713/153 |
| 2009/0220080 A1* | 9/2009 | Herne | ................ | H04L 63/0428 380/255 |
| 2010/0306547 A1* | 12/2010 | Fallows | ............... | G06F 21/305 713/178 |
| 2011/0078170 A1* | 3/2011 | Finn | ....................... | A63F 13/10 707/769 |
| 2012/0023160 A1* | 1/2012 | Marmor | ............. | H04L 67/2823 709/203 |
| 2012/0042160 A1* | 2/2012 | Nakhjiri | ................ | H04L 9/0844 713/151 |
| 2012/0110318 A1* | 5/2012 | Stone | .................... | H04L 9/3234 713/150 |
| 2013/0191631 A1* | 7/2013 | Ylonen | .............. | H04L 63/1483 713/153 |
| 2014/0143855 A1* | 5/2014 | Keoh | .................... | H04L 63/123 726/14 |
| 2014/0189093 A1* | 7/2014 | du Toit | ................... | H04L 47/10 709/224 |
| 2014/0331287 A1* | 11/2014 | Barr | ...................... | H04L 9/3268 726/4 |
| 2014/0337614 A1* | 11/2014 | Kelson | ................. | H04L 63/168 713/152 |
| 2015/0222602 A1* | 8/2015 | Steiner | ............... | H04L 63/0428 713/168 |
| 2015/0350900 A1* | 12/2015 | Kruglick | .............. | H04L 9/3236 713/168 |

OTHER PUBLICATIONS

Floroiu et al., A comparative analysis of the security aspects of the multimedia key exchange protocols, ACM 2009, 10 pages (Year: 2009).*

Gurbani et al., A Survey and Analysis of Media Keying Techniques in the Session Initiation Protocol (SIP), IEEE 2011, 16 pages (Year: 2011).*

Hess et al., Content-Triggered Trust Negotiation, ACM 2004, 29 pages (Year: 2004).*

Hummen et al., Tailoring End-to-End IP Security Protocols to the Internet of Things, IEEE 2013, 10 pages (Year: 2013).*

Ta-min et al., Splitting Interfaces: Making Trust Between Applications and Operating Systems Configurable, OSDI 2006, 14 pages (Year: 2006).*

Bonetto et al., Secure Communication for Smart IoT Objects: Protocol Stacks, Use Cases and Practical Examples, IEEE 2012, 7 pages (Year: 2012).*

McGrew, et al., "TLS Proxy Server Extension," TLS, Internet-Draft, Informational, Jul. 16, 2012, 18 pages.

Lesniewski-Laas, et al., "SSL splitting: securely serving data from untrusted caches," Proceedings of the 12th USENIX Security Symposium, Washington, D.C., USA, Aug. 4-8, 2003, 14 pages.

Mitmproxy Project, 2014, "How mitmproxy works," retrieved from http://mitmproxy.org/doc/howmitmproxy.html, on Jul. 10, 2014, 6 pages.

A10 Networks, Inc, "SSL Intercept: Securing Encrypted Traffic," retrieved from http://www.a10networks.com/products/ssl_intercept. php, on Jul. 10, 2014, 1 page.

* cited by examiner

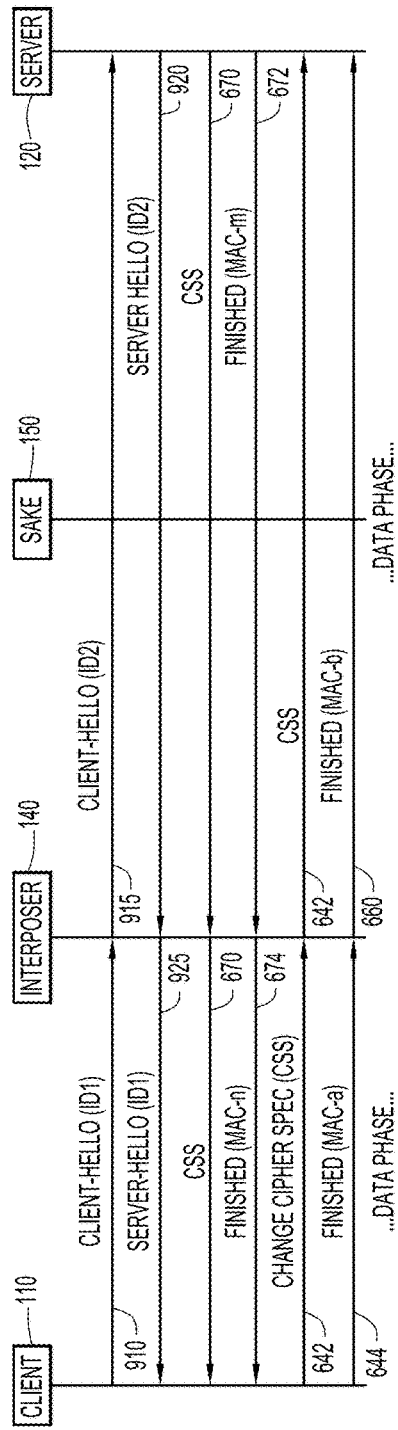
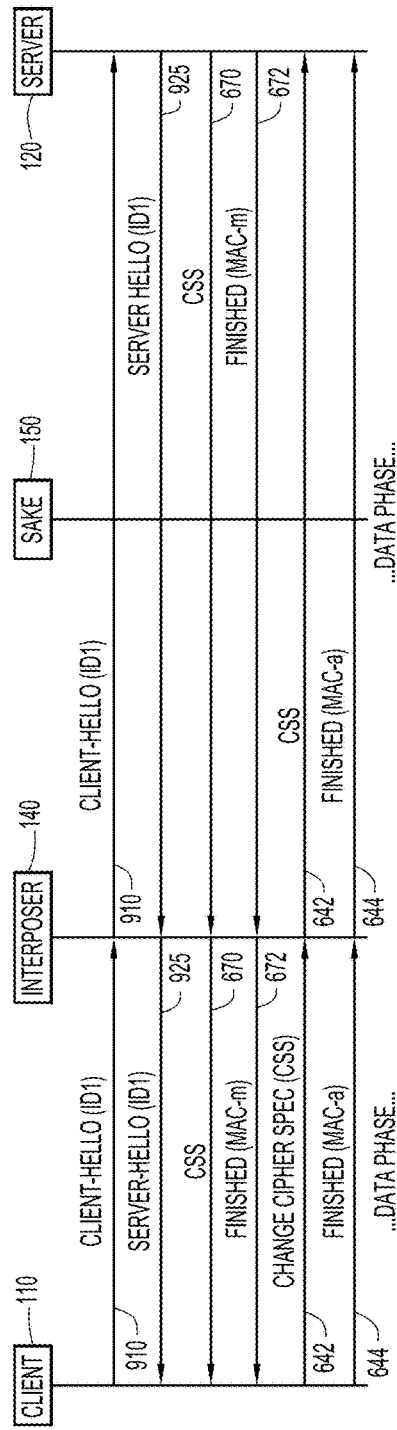
FIG.9A
FIG.9B

INTERPOSER WITH SECURITY ASSISTANT KEY ESCROW

CROSS-REFERENCE TO RELATED APPLICATIONS

This application claims priority to U.S. Provisional Patent Application No. 61/974,131, entitled "Interposer with Security Assistant Key Escrow," and filed on Apr. 2, 2014. The above application is hereby incorporated by reference herein in its entirety.

TECHNICAL FIELD

The present disclosure relates to providing network service functions on encrypted and/or signed application traffic.

BACKGROUND

Recently, applications are increasingly relying on encrypted transport protocols, like Secure Sockets Layer (SSL), Transport Layer Security (TLS), Microsoft Kerberos (MS-KRB), and/or Microsoft Windows NT LAN Management (MS-NTLM), rather than on network security. Application privacy and data integrity (e.g., encryption and signing), utilized by application protocol end-to-end, from the application client to the application server, effectively blinds the network and challenges the ability to provide continued network service functions.

Some products, from the fields like Wide Area Network (WAN) Optimization, security, Content Delivery Network (CDN), and Application Visibility and Control (AVC) solve this problem by proxying the security protocol on the network device. All these solutions rely on the network device being configured/provided with private keying materiel in order to be able to terminate session security and handle application traffic to access application plain text content.

The requirement of these products to hold private keying material imposes a constraint which may not be satisfied in all enterprise customer use cases and deployments. In some use cases, interposing devices will reside in a physical location or at an enterprise network perimeter where the interposing device cannot hold private keying material.

BRIEF DESCRIPTION OF THE DRAWINGS

FIG. 9A is a ladder diagram showing steps of an active interposer in a session resumption secured with an SSL/TLS security protocol according to an example embodiment.

FIG. 9B is a ladder diagram showing steps of a transparent interposer in a session resumption secured with an SSL/TLS security protocol according to an example embodiment.

DESCRIPTION OF EXAMPLE EMBODIMENTS

Overview

Figure 1:
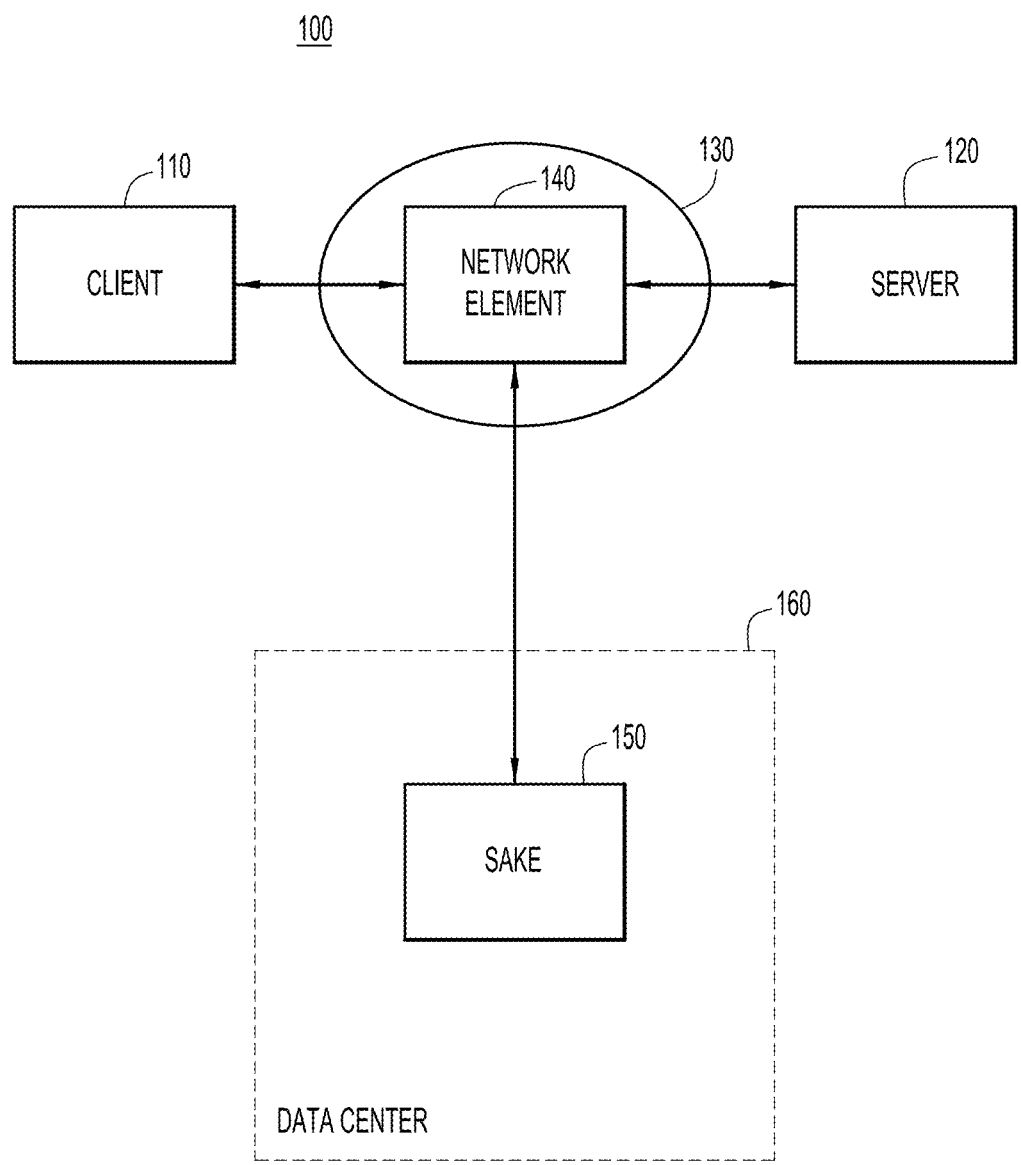
FIG. 1 is a system block diagram showing an interposer in a network connection between a client and a server according to an example embodiment.

The techniques presented herein provide for a method in which a network device receives a set of session initiation messages from a client device. The set of session initiation messages comprises an address for a server to initiate a secure session between the client device and the server. The network device forwards the set of session initiation messages to the server at the server address. The network device also forwards the set of session initiation messages to a security assistant device that is physically located in a secure location apart from the network device. The network device receives a session authorization from the security assistant device, which enables the network device to decrypt messages from the secure session between the client device and the server.

The techniques presented herein remove the constraint of holding private keys and allow a device at a non-secure location to get into a session security flow without comprising enterprise security, application security and overall network security.

Interposing devices are provided with only session state information and will not introduce a security threat. The interposing device is able to participate and inspect encrypted sessions traffic while residing in a non-secure location. If the interposing device or its hard-disk drive is stolen or misappropriated, it will not compromise the security of the application.

TERMINOLOGY

The following list describes acronyms and definitions for terms used herein:

Application—A client and server working together providing a function or capability to user/customer.

Application Protocol—The set of messages and method an application uses to communicate between client and server programs.

Application Security Protocol—The protocol application chooses to protect application protocol with, such as SSL/TLS, MS-KRB/MS-NTLM, etc.

Service or Service-Function: A network function operating on application protocol providing some desired network functionality over application traffic. Examples for such functionalities and services are WAN-OP (Wide Area Application Service (WAAS)—application protocol acceleration), Application level Firewall (FW), Application visibility and control over the network (e.g. network based application recognition (NBAR)) and other security and application level features such as cloud connectors.

Interposer—A component that processes encrypted traffic and provides application service from the application protocol in its clear form. An interposer resides in an interposing device.

Interposing device—A network device running a service that requires interposing into encrypted and/or signed application traffic (i.e., Service Node).

Service Node—A network device running a service function. A service node may include an interposer and as such is also an interposing device.

Service Node group—A group of devices providing application services for clear and/or encrypted application traffic.

Interception points—A place in the network that the service policy is inserted to switch the application traffic to proper service node group.

Security Assistant Service (SAS)—Entity able to aid the interposer and provide a session security state once provided with security protocol handshake token. The SAS is provided with any required privileges enabling it to participate in the Federation authority/Organizational Security Trust Domain in order to be able to retrieve or derive private key credentials. With the appropriate privileges, the SAS may conceptually or physically hold private keying material required to interpose into secured application traffic in a physically secured area.

Security Assistant Key Escrow (SAKE)—SAKE is synonymous with SAS but is used to avoid confusion with Software As A Service (SAAS). Both terms may be used herein.

Key Store (KS)—SAS component in charge of keeping/storing private keying material in secure manner.

SAKE Transport—SAKE component interacting with an interposer. The SAKE transport component receives security tokens and returns the security session state to the interposer.

SAKE Authorizer—SAKE component responsible for authorizing an interposer involving a security model between the interposer and the SAKE. The results of that operation will be a security token that the interposer gets to be an authorized client for getting SAKE security services.

Interposer Modes:
  a. Active Interpose—An active interposer will terminate security handshakes and be an active proxy. In this mode, the interposer cannot remove itself from processing the security protocol for all application protocol traffic without causing a connection reset.
  b. Transparent Interpose—A transparent interposer will not terminate security handshakes. Transparent interposing allows an application service to stop processing application protocol and request that the interposer remove itself from processing application security protocol without causing an error to the application.

Application Service Modes:
  a. Observer (Passive): A service function that observes the application protocol. An observer interposer will not apply any changes to the traffic between a client and a server. It is able to decrypt the traffic and provide it to the service. Services which do not involve altering the application protocol, such as Application Visibility and Control (AVC) and Intrusion Prevention/Detection Systems (IPS/IDS) may use this mode. An AVC service may identify the application and/or other traffic characteristics to match the traffic to a Quality of Service policy or other flow control feature. An IPS/IDS service may terminate the session and close the service and/or host, but in the passive mode will not alter the application protocol messages.
  b. Modifier (Active): A service function that performs modification to the application protocol traffic. After performing a first modification to application protocol messages, a modifier service function cannot remain in a transparent interposing mode. As such, the interposer cannot request removal from processing security protocol even if interposed during security protocol handshake using a transparent interpose mode.

Interposer Session Manager (ISM): Interposer component handling security protocol handshake tokens. The ISM communicates with the SAKE to acquire the security session state.

Interposer Encrypt/Decrypt (IED)—Interposer component holding security session state and providing decryption/encryption services to the service node to process application traffic as needed.

Root Certificate Authority (CA)—A CA configured in a client machine authorized to authenticate a server certificate. As used herein, a Root-CA can be an Enterprise WAN private CA authorized to authenticate an interposer-provided proxy certificate when an active interpose mode is used.

Active Directory (AD) Domain Identity—An AD account used by the SAKE to retrieve AD secrets providing the interposer with the session state.

Domain Controller (DCtl)—A Windows server providing Active Directory services as defined and required by Microsoft protocols.

Generic Security Services Application Programming Interface (GSSAPI)—An Internet Engineering Task Force (IETF) API for programs to access security services.

MS-NTLM—Microsoft NT LAN Manager

MS-KRB—Microsoft Kerberos 5 protocol

Key Distribution Center (KDC)—A Kerberos component that holds private keys of servers.

Kerberos Constrained Delegation (KCD)—A Kerberos extension of multi-tier service solutions in which the client identity is maintained along the path for all of the services. Each service may properly authenticate and authorize based on the original user identity and service authenticating on behalf of the original client.

Security Support Provider Interface (SSPI)—An interface that allows an application to use various security models available on a computer or network without changing the interface to the security system.

Data Center (DC)—A secure location, typically on a corporate physical campus, with network attachment to an Enterprise network/WAN. As used herein, the DC is considered secured (physically and part of Enterprise Intranet secure network perimeter).

Branch (BR)—An enterprise remote location which Edge network devices connected to the Enterprise WAN as well as to the Internet, where Enterprise IT Cloud services and enterprise cloud applications may reside.

EXAMPLE EMBODIMENTS

The infrastructure configured to provide an Encrypted Application Experience aims to provide application services by seamlessly interposing into application security protocol at any network location (e.g., branch or DC). Several network elements play roles in this infrastructure by hosting a set of logical functional elements that enable seamless interposing.

The techniques presented herein involve functional elements in an encrypted protocols infrastructure solution. Requirements on the functional elements may be derived from considering various use cases with the services and topologies. The functional elements in the solution may be realized in any physical form factor by meeting these requirements.

In one example, a network service function may be required to operate on application protocol traffic. An application may apply a security protocol to protect itself. In order for the service function to perform its work, it needs encryption services to provide the application protocol in its clear form. The service function may use the encryption services solution described herein. For the service node encryption services, the interposer will interface with the security protocol and inject itself as a man-in-the-middle in the application security protocol in order to deliver the application traffic in it clear form to the service function. Thereafter, the service function can successfully perform it service logic.

The interposer may interpose into the application security protocol by obtaining an application session security state. The interposer will do so without holding any private keying material of the client or the server with the aid of an out-of-band Security Assistant Key Escrow service (SAKE). The SAKE may reside in a secure physical network perimeter and it may hold private keying material required to derive session keys for interposing into the application security protocol. During security protocol handshake, the interposer will send security protocol handshake messages to the SAKE, and in return will get back a session security state from the SAKE. The session security state allows the interposer to participate in the application security protocol.

Specific security protocol handshakes are included herein as use case diagrams covering envisioned security domain and protocol handshakes.

The service node injects the encryption service interposer into the application traffic flow by intercepting the application traffic stream as a processing point. The interposer may process the application security protocol. It also injects the application service function into the stream. The interposer is in charge of providing the data payload of the security protocol to the service function, and the interposer handles the security protocol handshake on its own. The interposer obtains a session security state while the security protocol is initializing and before security protocol data phase has started. During the security protocol handshake, the interposing mode and capabilities may be decided. The interposer may be an end-point of the application security protocol handshake (referred to as an active interposer), or the interposer may be determined to be a transparent interposer during the handshake. A transparent interposer does not alter any of the handshake messages between the client and the server, and the interposer is not an end point of the security handshake during session establishment. A transparent interposer may be passive in the case the service function is an observer. In this case, the encryption service needs only decryption capabilities. A transparent interposer may turn active, when a service function modifies application data at the proxy, since this may have security implications, which will be properly handled by interposer. By the time the security protocol data phase starts, the interposer has obtained a session security state and can operate entirely on its own without any external help. The interposer, operating on its own, relies on the SAKE exporting the security state to the interposer in a secure manner.

Referring now to FIG. 1, an example embodiment of the system 100 of devices and network connections described herein is shown. A client 110 and server 120 are engaged in a secure session through network 130. A network element 140 acts as an interposing device in the secure session. The interposing device 140 receives access to the secure session from the SAKE 150, which is located at a data center 160 in a different location than the interposing device 140. The interposing device 140 does not store any private keys, and relies on the SAKE 150 to provide access to the secure session.

Only one data center, client, and server are shown in FIG. 1, but any number of endpoints and/or data centers may be included in system 100. Endpoint devices 110 and 120 and SAKE 150 may take a variety of forms, including a desktop computer, laptop computer, server, mobile/cellular phone, tablet computer, Internet telephone, etc. Network 130 may be any type of network (e.g., any combination of Internet, intranet, local area network (LAN), wide area network (WAN), wired network, wireless network, etc.) that connects computing devices, e.g., client 110, server 120, and data center 160.

Transparent Interposing

Transparent proxy interposing allows the client 110 and the server 120 to engage in a session handshake without the interposer modifying any of security protocol handshake messages. In order for interposer to be able to obtain session state either the SAKE 150 must hold the private key of server 120, or the SAKE 150 is able to establish a secure relationship with server 120 (or a server that has the private key of server 120) to receive a keying state from it and convey the key to the interposer 140 in the form of a security protocol session state. The latter approach is considered SAKE-tiered architecture.

Transparent proxy interposing is designed to allow a passive service to remove itself from the network service chain. Since some observer services may complete their service function within the first few messages of the application traffic, this will enable the interposer in a passive transparent interpose to stop processing application security protocol messages and remove itself from service chain.

Active Interposing

An active interposer 140 may modify the security protocol handshake. The interposer acts as an end point of the security protocol handshake from both the client 110 and the server 120. This means that between the client 130 and interposer 140 there will be a first security protocol session, and a second security protocol session between the interposer 140 and server 120.

Active interposing may be achieved by enabling the client 110 and server 120 to trust the interposer 140. In an example using SSL, the SAKE 150 has private keys or a proxy certificate to be authorized by an approved CA on behalf of server 120 and client 110. In another example using AD, the proper AD permissions are configured in the domain to allow the interposer 140 to present itself to the server 120 on behalf of the client 110 and to the client 110 on behalf of the server 120.

Interposer 140 may transition from transparent interposing to active interposing. In one example, a modifier service function initially using transparent interposing may lead interposer 140 to transition to active interposing to avoid security vulnerabilities to the application and its security protocol. An interposer that identifies any degradation of the security protocol caused by the interposing device will trigger a re-negotiation of the session. In one example, a modifier service may use the transparent mode in unsafe way (depending on the cipher suite used and the amount of data transferred between the client and the server). Once a modifier service has modified the first message of the application protocol, it can no longer remove itself from the service chain, and cannot return to using a transparent interpose capability.

Figure 2:
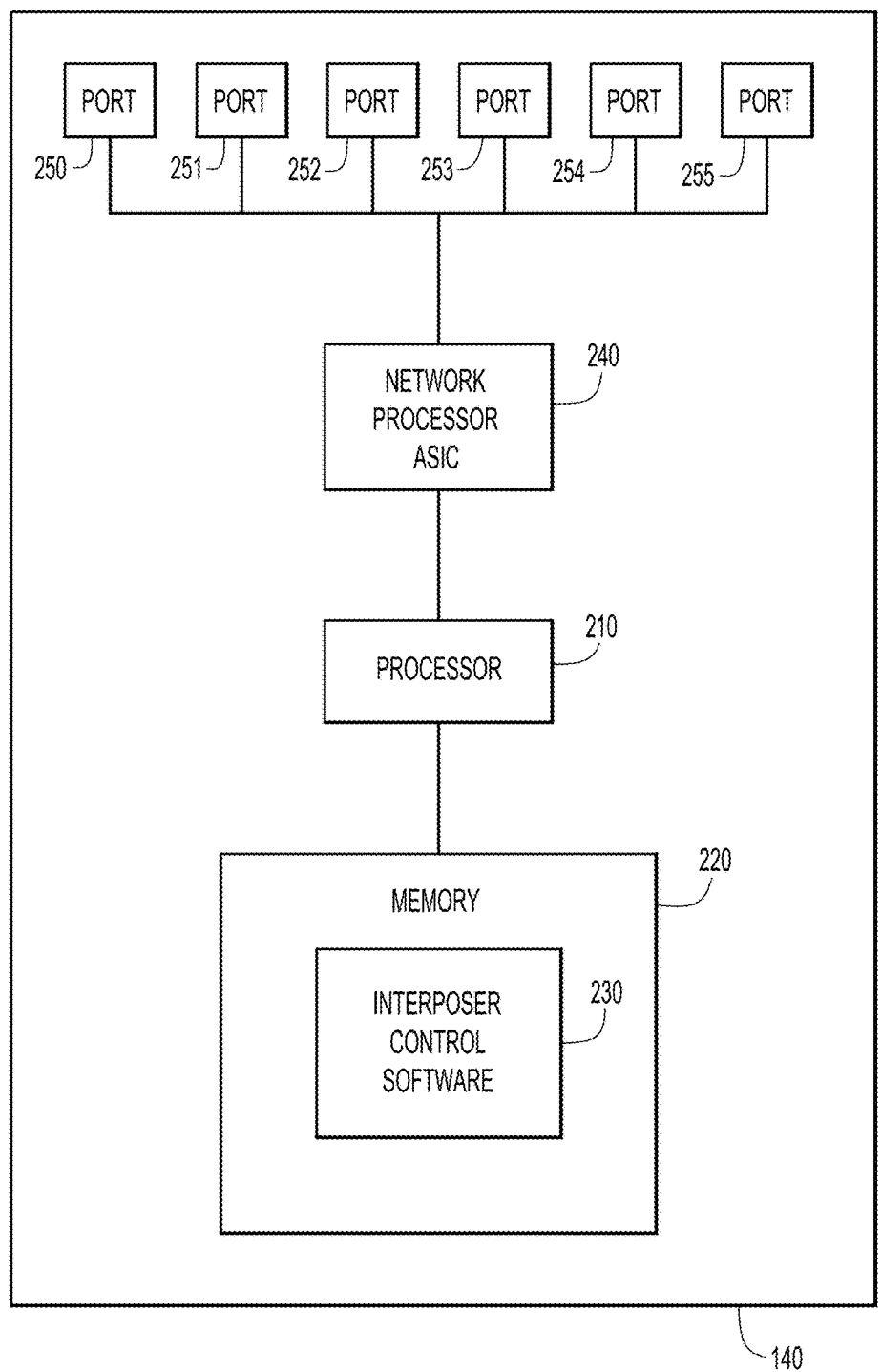
FIG. 2 is a simplified block diagram of an interposer according to an example embodiment.

Referring now to FIG. 2, a simplified block diagram of a network element 140 configured to serve as an interposing device is shown. Network element 140 includes, among other possible components, a processor 210 to process instructions relevant to serving as an interposing device, and memory 220 to store a variety of data and software instructions (e.g., interposer control software 230, communication packets, etc.). The network element 140 also includes a network processor application specific integrated circuit (ASIC) 240 to process communication packets that flow through the network element 140. Network processor ASIC 240 processes communication packets to and from ports 250, 251, 252, 253, 254, and 255. While only six ports are shown in this example, any number of ports may be included in network element 140.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
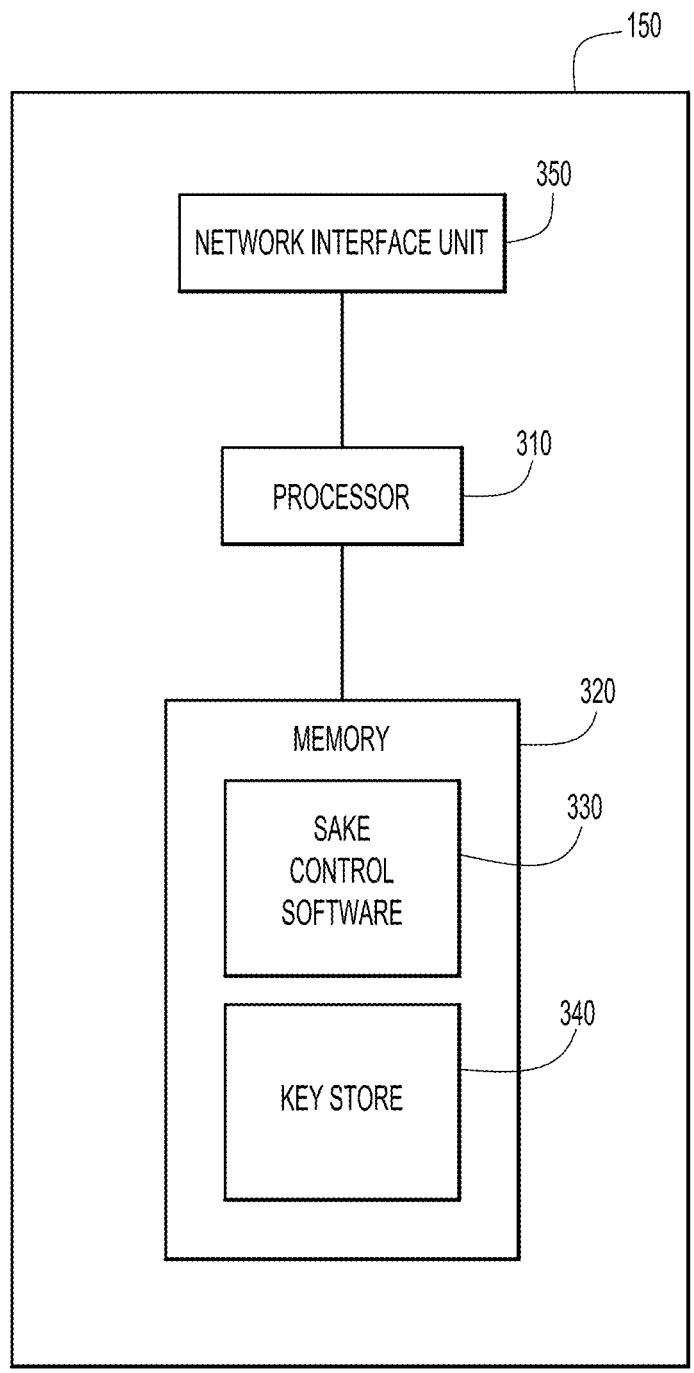
FIG. 3 is a simplified block diagram of a Security Assistant Key Escrow (SAKE) according to an example embodiment.

Referring now to FIG. 3, a simplified block diagram of a SAKE 150 configured to assist an interposing device is shown. SAKE 150 includes, among other possible components, a processor 310 to process instructions relevant to serving as an interposing device, and memory 320 to store a variety of data and software instructions (e.g., SAKE control software 330, key store 340, etc.). The SAKE 150 also includes a network interface unit 350 to communicate with other computing devices (e.g., interposer 140) through the network element 140. Memory 320 may comprise read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein.

Figure 4:
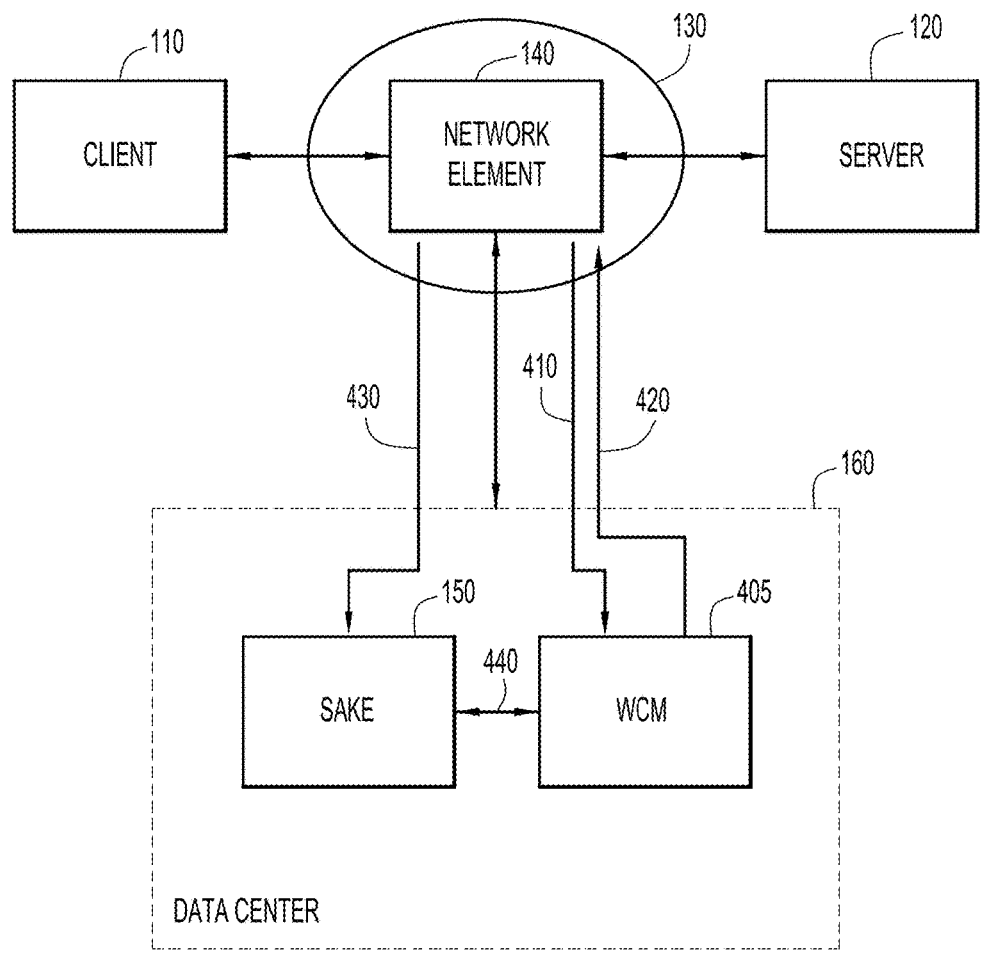
FIG. 4 is a system block diagram showing an interposer authorizing itself according to an example embodiment.

In order for the interposer to be serviced by the SAKE, it may need to be authenticated and authorized. FIG. 4 illustrates an example of Interposer Authorization and SAKE transport security. The data center 160 includes an authorizer 405, for example, a WaaS Central Manager (WCM). The interposer 140 sends a message 410 to WCM 405 registering the interposer 140, and requesting a security token to communicate with the SAKE 150. The WCM 405 responds with message 420 comprising the security token. When the interposer 140 requires the services of the SAKE 150, it sends the service request and security token in message 430. The SAKE 150 may authenticate the security token with the WCM 405 through a trusted connection 440 internal to the data center 160.

In one example, the interposer to SAKE communication may use SSL as the security application protocol for secure transport of their application protocol messaging. SSL certificates may be used for mutual authentication (interposer authenticating to SAKE & SAKE authenticating to interposer).

For authorization, security tokens may be used in one of the following forms:
1. Security authorization key (aimed to handle Enterprise application services)—is a secret that the SAKE 150 holds identifying a specific interposer 140. The key is configured by the SAKE authorizer 405 and sent to the interposer 140 and the SAKE 150:
   a. One-time authorization key—Every time a new interposer connects to the SAKE with a new SSL session for first its first TCP connection, it may need to provide a new authorization key. Every time a previously authorized TCP connection between an interposer and the SAKE is terminated, the SAKE may invalidate the one-time authorization key. The interposer may need to issue a new key every time it tries to establish its initial authorized and secured TCP connection to the SAKE. In one example, a one-time authorization key is used for re-authorizing the interposer to the SAKE every time the interposer is rebooted or powered up (e.g., moving it from one location to another, etc.).
      i. User provided one-time key—Every time an interposer boots, a key token is generated based on a user input or passphrase. The ability to provide this user passphrase is proof of an authorized interposer booting up, and provides a proper token to the SAKE authorizer 405 to authorize the interposer for the SAKE.

ii. Hard-token based key token generator one-time key—In this example, the interposer uses a hard-token key generator which can be accessed and used in cases in which the interposer boots while located in a proper rack slot location. The security is obtained by the interposer residing at a proper physical location at boot time. For example, the hard-token device may be a physical part of the computer rack in which the interposer resides. Only network devices residing in this rack are can physically access the hard-token device. It may also be physically connected to the data-center concrete wall, or another relatively immobile object in the data center. This ensures that the interposer is located in a proper physical place in order to be serviced. Hard-token authorization allows the interposer to be authorized without needing user intervention. Any time an interposer boots up or connect to the SAKE for its first TCP connection, it will automatically be able to generate a proper authorization key.

b. Long term persistent authorization key—In this mode the interposer receives a long term, persistent key. The key is received during the interposer setup and configuration. The interposer may use this key across multiple reboots and multiple interposer-to-SAKE connections and sessions. The SAKE may support invalidating an interposer's token by a management system. The SAKE may also support identifying suspicious interposer connections in which the security token and the network characteristics do not match.

2. Security Assertions Markup Language (SAML)/federated services certificates (Aimed to service cloud application services—it may also be used for Enterprise services but is required for cloud services)—The security of the interposer-to-SAKE communication follows SAML and federated services concepts. The interposer will authenticate and authorize with its federated service SAKE authorizer component. That federation authority for the interposer will issue a federation services ticket which can be validated by the SAKE and used as the security token to identify the interposer. The security token may also be used to authorize the interposer for the applications described in the federation ticket and comply with the permissions of the SAKE with the federation authority server issuing the interposer ticket. The reasons SAML/federated services may be used for cloud based services in a cloud architecture:

a. The SAKE may be sitting in a cloud-provider realm, and may not be able to directly authorize an interposer.

b. A single SAKE may service interposers from multiple enterprises and separate security realms. Each interposer maintains its internal realm trust beyond the SAKE's reach.

c. For every interposer domain, the SAKE will need to know an associated federation authority in which it can validate interposers' ticket signatures.

d. The interposer is authenticating and authorizing itself to the SAKE authorizer in the security realm of the interposer. The SAKE authorizer issues a ticket as federation authority on behalf of the client to be used by the interposer with the SAKE.

e. The SAKE authorizes the interposer by validating its ticket from its enterprise federation service SAKE authorizer. That service is a federation authority to the connected SAKE. The SAKE that will authorize the interposer asks for the service by validating the ticket associated to its federation authority and makes sure the ticket provided is signed properly by the same authority that the interposer belongs to.

The interposer's security token may be validated by the SAKE and invalidated, in compliance with the authorizing modes and types provided above, in case the interposer is compromised.

In one example, the interposer-to-SAKE operability may require an initial one-time configuration setup. This setup relies on a management system in place (e.g., the SAKE authorizer). After the initial setup is complete, the solution is self-provisioned and may operate without user intervention. The configuration setup may involve assigning SSL transport certificates for interposer-to-SAKE peering, as well as modes and methods for the interposer to obtain a security token key. The interposer may need to be able to authorize itself with the SAKE. An unauthorized interposer might be able to connect to SAKE, if it has obtained a proper certificate, but the unauthorized interposer will not be serviced. The security token may be provided by the SAKE-Authorizer as part of interposer device registration. A management entity (e.g., a WaaS Central Manager (WCM)) proving SAKE authorizer functionality can be put in place. The interposer will move to an active, connected state once authenticated and authorized.

Security Protocols

Table I shows some examples of features and security protocols that may use an interposer as described herein:

TABLE 1

Security Protocols

| Feature | Description |
| --- | --- |
| SSL/TLS over Transmission Control Protocol (TCP) | |
| SSL/TLS passive | A passive mode uses transparent interposing. It only supports an observing mode, since it only performs decryption. It allows the interposer to remove itself from processing data at any point in the secure session. |
| SSL/TLS Transparent-proxy | A transparent-proxy mode uses transparent interposing during the SSL handshake. During the SSL data phase, a transparent-proxy interposer may perform decryption and encryption. It will be able to alter data if needed (e.g., WAN-Op, Cloud-connected) towards |

TABLE 1-continued

Security Protocols

| Feature | Description |
|---|---|
| SSL/TLS Active-proxy | the client or the server. The interposer may transition to active interposing (e.g., if security vulnerabilities are encountered). An active proxy mode uses active interposing. The interposer is an end point of the security protocol handshakes with the client and the server. Two SSL sessions are established: one between the client and the interposer, and one between the interposer and the server. |

DTLS - SSL over User Datagram Protocol (UDP)

| Feature | Description |
|---|---|
| DTLS passive | Supports observing mode only. This mode only performs decryption. Similar to TCP transport but over UDP. This mode assumes support from the networking layers to properly handle the UDP protocol and intercept the UDP protocol data unit (PDU) to the interposer. |
| DTLS Transparent-proxy | Similar to TCP but over UDP. |
| DTLS Active-proxy | Similar to TCP but over UDP. |

MS-AD Security protocol - Single domain tree - using Domain Identity (DI):
The client and server reside in a single domain tree. The SAKE is configured with an active directory domain-identity which has the proper permissions to retrieve proper accounts attributes in the AD domain accounts data base to deliver a session key state to the interposer.

| Feature | Description |
|---|---|
| MS-NTLM Passive-proxy MS-KRB Passive-proxy | An interposer uses transparent interposing for an observer application service. The security protocol handshake and authentication are not terminated. In the data phase, the interposer only supports decryption. |
| MS-NTLM Transparent-proxy MS-KRB Transparent-proxy | An interposer uses transparent interposing for a modifier application service. The security protocol handshake and authentication are not terminated. In the data phase, the interposer may support decryption and/or encryption. |

MS-AD Security protocol - Domain forest - One/Two way trust
Client and server reside in separate domain trees. The domain tree has a cross domain trust established (one/two way trust).

| Feature | Description |
|---|---|
| MS-NTLM Passive-Proxy | An interposer uses transparent interposing for an observer application service. The security protocol handshake and authentication are not terminated. In the data phase, the interposer only supports decryption. The SAKE may be configured with an active directory Domain-Identity (DI) in the client application domain. The SAKE-DI has the proper permissions to retrieve proper accounts attributes in the clients' AD domain and deliver a session key state to the interposer. |
| MS-NTLM Transparent-proxy | An interposer uses transparent interposing for a modifier application service. The security protocol handshake and authentication are not terminated. In the data phase, the interposer may support decryption and/or encryption. The SAKE may be configured with an active directory DI in the client application domain. The SAKE-DI has the proper permissions to retrieve proper client account attributes in the clients' AD domain and deliver a session state to the interposer. |
| MS-KRB Passive-Proxy | An interposer uses transparent interposing for an observer application service. The security protocol handshake and authentication are not terminated. In the data phase, the interposer supports only decryption. The SAKE may be configured with an active directory Domain-Identity DI in the server domain. The SAKE-DI has the proper permissions to retrieve proper accounts attributes of the server in the servers' AD domain and deliver a session state to the interposer. |
| MS-KRB Transparent-proxy | An interposer uses transparent interposing for a modifier application service. The security protocol handshake and authentication are not terminated. In the data phase, the interposer may support decryption and/or encryption. The SAKE may be configured with an active directory DI in the server domain. The SAKE-DI has the proper permissions to retrieve proper accounts attributes of the server in the servers' AD domain and deliver a session state to the interposer. |

MS-AD Security protocol Active interpose -

TABLE 1-continued

Security Protocols

| Feature | Description |
|---|---|
| Active interpose in Domain-Tree/Domain forest/Federated Services | |
| MS-NTLM Active-Proxy MS-KRB Active-Proxy | A Kerberos constrained delegation may be used at the interposer. The interposer will operate on behalf of a SAKE domain identity. The interposer will terminate the client-to-proxy handshake. The client is authenticated using regular AD method, and the server, using the SAKE, may issue a Kerberos session using constrained delegation maintaining client identity between the interposing device and the server. The interposer identity will be SAKE-based. The SAKE may be configured with an active directory DI in the server domain. The SAKE-DI has the proper permissions and is configured in the server domain to allow Kerberos-constrained delegation to a Kerberos service client. |

Use Case and Topologies

The following section presents various use cases and topologies considered. It serves to provide a non-exhaustive explanation and list of examples of where and how the solution may be used:
1. Service function in mind—This list is an example of service and not an exhaustive list of the services which can use this architecture.
2. Deployment scenarios and use cases
3. Network topology supported use cases Applicable Network Services:
  1. Application visibility use case:
    a. Reporting and monitoring (vPath3.0 device with application identification capabilities may be required from service node to report the application identification to an intercepting point).
    b. Quality of Service (QoS) marking.
  2. WAN optimization (single sided/dual sided)
  3. Deep packet inspection such as:
    a. Security
    b. Data analytics
  4. Cloud-Connector for encrypted application traffic Third party cloud connecters may impose security challenges. The techniques presented herein address some aspects of the security challenges.

In some examples, services may be split between encrypted traffic to an enterprise data center and encrypted traffic to an outside cloud service.

Deployment Use Cases:
  1. Enterprise network going to internet
  2. Internet to enterprise network
  3. WAN Enterprise intranet traffic In one example, a service function may need to process encrypted application traffic, and the service function will use encryption services. A client going from the internet directly to an enterprise SAKE, without going through the enterprise network, may also be included as an enhancement.

In one example of a deployment use case, an enterprise user may go from the enterprise corporate network to the internet for an Enterprise SAAS application through at least one of the following paths:
  a. From branch to the internet SAAS
  b. From branch to Data-Center over WAN/Virtual Private Network (VPN) and then to internet
  c. From Data-Center to internet SAAS In another example, a home user or Bring Your Own Device (BYOD) user connects to an enterprise network over a VPN and then connects to the SAAS residing in the enterprise WAN or intranet, or go out again to the internet SAAS from the enterprise network.

In yet another example, WAN Enterprise traffic may be Dual sided (e.g., as known in WAAS 5.x and prior) or Single sided (e.g., no peer protocol involved among the service nodes on the path).

Network Topologies

The desired service function may be accommodated in various network topologies and the interposer will incorporate within the topology to support service function. The interposer, together with the service function, will rely on the network service architecture for switching the application traffic toward the service node. The considered topologies are the supported use cases of services architecture infrastructure.

Figure 5:
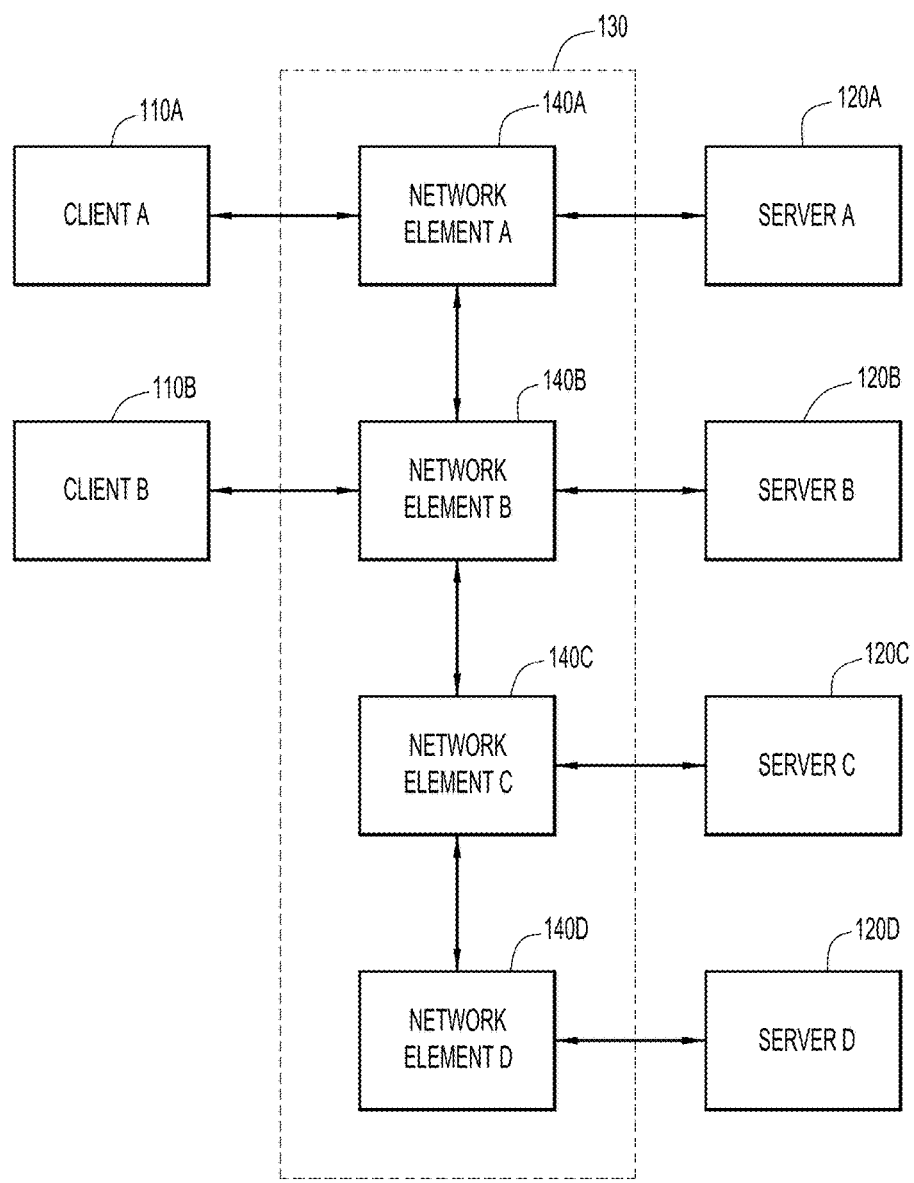
FIG. 5 is a system block diagram of network connections between clients and servers according to an example embodiment.

Referring now to FIG. 5, an example network topology is shown. Client 110A and client 110B can communicate with any of server 120A, 120B, 120C, or 120D through network 130. In this example, network element 140A is the closest network element to client 110A and server 120A. Similarly, network elements 140B is the closest network element to client 110B and server 120B. Network elements 140C and 140D are the closest network elements to servers 120C and 120D, respectively. In some examples, network 130 may comprise multiple networks, such as enterprise WANs, public internet, etc.

In one example, when client 110A communicates with server 120D, any of the network elements along the path (i.e., network elements 140A, 140B, 140C, and/or 140D) may act as an interposer. In some examples, it may be advantageous to locate the interposing device as close to the server as possible, and network element 140D will be chosen to perform as an interposer in the communication session between client 110A and server 140D.

In another example, a customer may deploy a single service, firewall (FW), location-based (LB), and/or or Wide Area Application Service (WAAS), which will rely on the interposer for processing encrypted application traffic. The service may be deployed in the DC or in a branch. The service may be running on a physical appliance, or in a VM. Both automated and manual placement of service resources at a content-centric networking (CCN) control point may be considered. There may be more than one interception points, and these interception points may all be in one location or two different locations.

In yet another example, a customer deploys a single service, but may want to scale beyond the capacity of a single node either to begin with (or incrementally). The customer may also want to partition the available set of service nodes for handling different set of traffic. In still another example, a customer may deploy more than one service at the same time (or incrementally) and sequence them in a particular way.

The following three sections describe features that may be supported by the interposing method described herein:

Interposing Modes

The interposer may support active interposing and/or transparent interposing. An observer service function may use transparent interposing and/or active interposing. An observer service function using transparent interposing will only perform decryption of the application data for the application service observer. An observer service function using transparent interposing may remove itself from processing application traffic.

A modifier service function may support active interposing or transparent interposing. The encryption service (e.g., the interposer) will transition from transparent interposing to active interposing, for cases in which application security may become comprised due to the nature of a modifier service using same session key for two different clear-text application streams.

Scalability and Performance

The interposer may use a long term connection to the SAKE, and multiplex multiple session retrievals for different client server connections and sessions. The interposer may scale the number of connections to the SAKE based on the number of parallel security protocol handshakes occurring at the same time. The interposer may open its first connection at boot time. The interposer, while operational, may have at least one secure, active connection to the SAKE. The interposer may close its last connection to the SAKE if the interposer is being removed from operation. The interposer may use connection pooling to the SAKE. The interposer may refresh connections in the pool on regular basis. Every interposer-SAKE connection may be active up for a predetermined amount of time (e.g., up to one hour), before being dropped from the pool. The interposing system may support clustering of SAKE nodes. Several SAKE nodes may be grouped to allow scaling as needed. The interposer and the SAKE may support load balancing in front of the SAKE. A load balancer may be used to terminate the SSL protocol between the interposer and the SAKE.

Usability, Operability and Security

The interposer-SAKE connection may use TLS-1.2 and mutual authentication (e.g., client certificates and server certificates). The interposer-SAKE connection may use a secure cipher suite (e.g., EDH RSA-2048 with AES-128 SHA-96). An interposer-SAS application programming interface (API) and security services may be stateless. Each request may stand on its own within the context of secured, authorized interposer-SAKE TCP connection. Each security service request in the SAKE may be processed independently of other messages and/or requests. The interposing system may support service interception and chain capabilities. Clustering of service nodes into a service nodes group may allow scaling of a particular application service function.

Work, Control & Data Flows

FIGS. 6A, 6B, 7, 8, 9A, 9B, 10A, 10B, 11, 12B, 12C and 12D show examples of the above described use cases. Specifically, these figures show following message flows:

1. Work flows of how a customer achieves the use cases described above.

2. Control flows that engage the functional components described above for each use case.

3. Data flows that happen through the functional components for each use case.

By interposing into the application security state using the SAKE, an interposer can have a security protocol handshake specific handshake sequences within the described shared architecture. FIGS. 6A, 6B, 7, 8, 9A, 9B, 10A, 10B, 11, 12B, 12C, and 12D illustrate example ladder sequence diagrams and specific security protocol aspects for interposing into application session security for some example handshakes. The technical detail and aspects for active interposing and transparent interposing will be described below for each handshake.

SSL/TLS/DTLS Interposing

SSL/TLS supports multiple handshake modes as well as client authentication, re-handshake and session resumptions. FIGS. 6A, 6B, 7, 8, 9A, 9B, 10A, 10B, 11 show interposing into the SSL handshake modes, and describe other aspects involved in the interposing. The diagrams for the client, server, interposer, and SAKE during security protocol establishment handshake, explaining how the interposer obtains the session state is provided explicitly for an RSA handshake (FIGS. 6A and 6B), an ephemeral RSA handshake (FIG. 7), an SSL Re-handshake (FIG. 8), an SSL resumption handshake (FIGS. 9A and 9B), TLS-SessionTicket handshake (FIGS. 10A and 10B), and a TLS-Preshared Key (PSK) (RFC4279) handshake (FIG. 11). Similar handshakes are envisioned, such as ephemeral RSA, Diffie-Hellman (DH) Digital Signal Standard (DSS), Ephemeral DH (DHE) DSS, DHE RSA, elliptic ciphers, client certificates (RSA/DHE), Server Gated Cryptography (SGC), and Kerberos TLS (RFC2712)

Figure 6A:
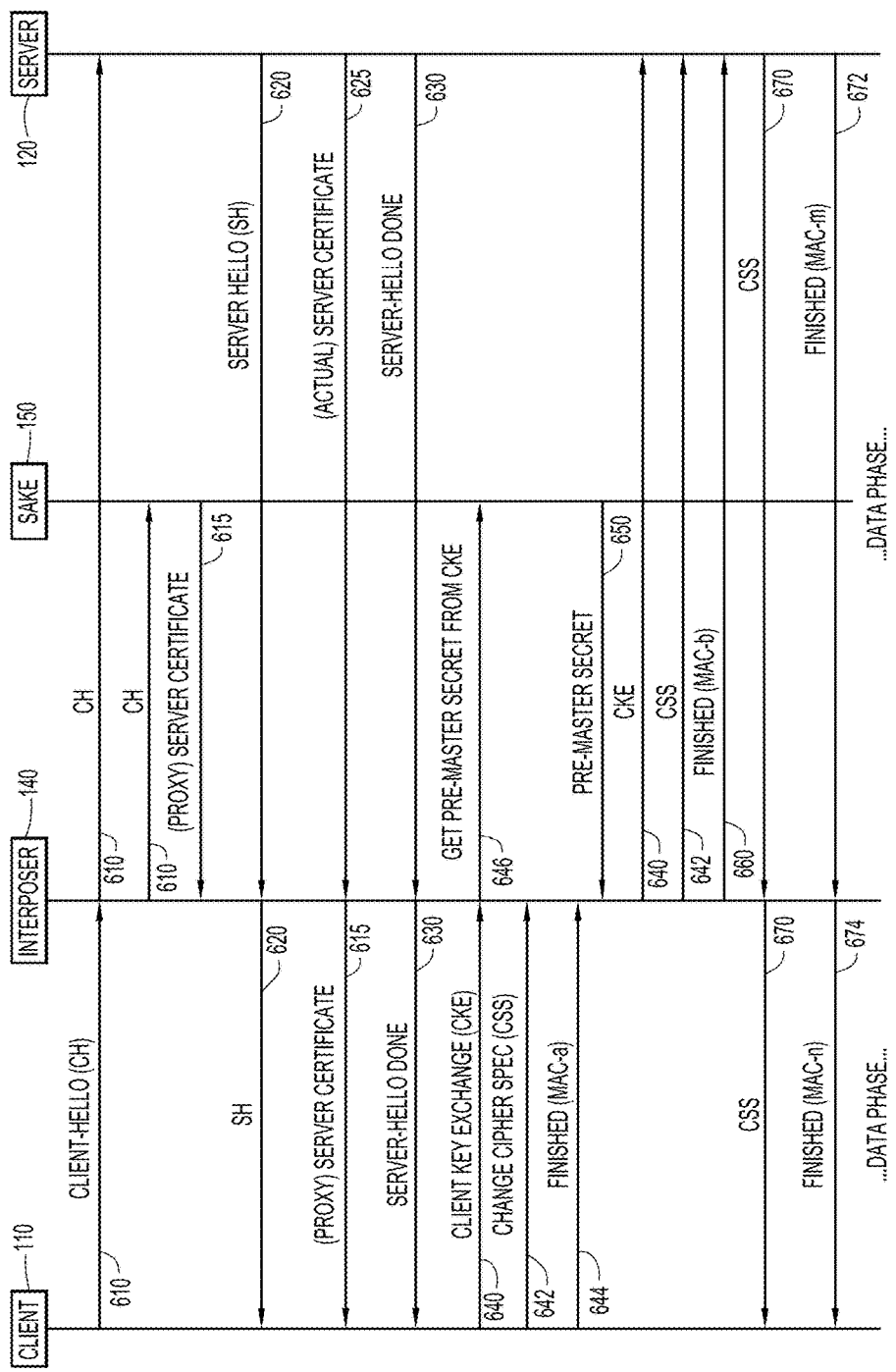
FIG. 6A is a ladder diagram showing steps of an active interposer in a session secured with a Secure Sockets Layer/Transport Layer Security (SSL/TLS) RSA security protocol according to an example embodiment.

Referring now to FIG. 6A, a ladder diagram for an RSA/SSL handshake for an active proxy interposer is shown. A client 110 initiates the handshake by sending a Client-Hello (CH) message 610 to a network element 140 that is acting as an interposer. The interposer forwards the CH message 610 to the server 120 and the SAKE 150. The SAKE 150 returns message 615, including a proxy server certificate that is certified for the server by an enterprise root CA, to the interposer 140. The server 120 responds with a Server-Hello (SH) in message 620, which the interposer 140 forwards to the client 110. The server 120 also sends its actual server certificate (e.g., a certificate issued by a public CA) to the interposer 140. Since the interposer 140 will act as an active interposer in this example, the interposer sends the proxy server certificate 615 to the client 110 instead of the actual server certificate 625. The server 120 then sends a Server-Hello Done message 630, which the interposer 140 forwards to the client 110.

The client 110 sends a Client Key Exchange message 640, including a Pre-Master secret encrypted with the server's public key, a Change Cipher Spec (CSS) message 642, and a Finished message 644, including its MAC address (MAC-a). The Pre-Master secret for the session between the interposer and the server may be different than the Pre-Master secret for the session between the client and the interposer for each communication flow between client and server to provide maximum security. For performance and scalability purposes, in some cases, it may be secure enough to use the same Pre-Master secret on both ends of the interposer. In an active state, the interposer may use the client generated Pre-Master secret value and reduce CPU computation load on the interposer service node, since the generation of Pre-Master secrets is typically considered a high computation operation. The Interposer 140 does not have the server's private key to decrypt the Pre-Master secret, and sends the encrypted Pre-Master secret to the SAKE 150 in message 646. The SAKE 150 decrypts the client's Pre-Master secret and returns it to the interposer 140 in message 650. The interposer may request a separate Pre-Master secret for the interposer-to-server session. The SAKE 150 may provide the separate Pre-Master secret in the same message 650.

The interposer 140 forwards the CKE message 640, the CSS message 642, and generates a Finished message 660, including a separate MAC address (MAC-b). The server 120 finishes the handshake by replying with CSS message 670 and Finished message 672, including it MAC address (MAC-m). The interposer 140 forwards the CSS message 670 and generates its own Finished message 674, including a new MAC address (MAC-n). With the handshake finished, the data phase of the communication session can now begin.

In this example of an active proxy interposer, the interposer 140 has initiated two secure communication channels. One secure channel is between the client 110 and the interposer 140 as a channel between MAC-a and MAC-n. The second secure channel is between the interposer 140 and the server 120, as a channel between MAC-b and MAC-m. Since the interposer 140 saves the client's decrypted Pre-master secret, it can decrypt any of the messages in the communication session. However, the interposer does not save the server's private key that the SAKE 150 used to decrypt the Pre-Master secret, ensuring the privacy of future sessions in the event the interposer 140 is compromised.

Figure 6B:
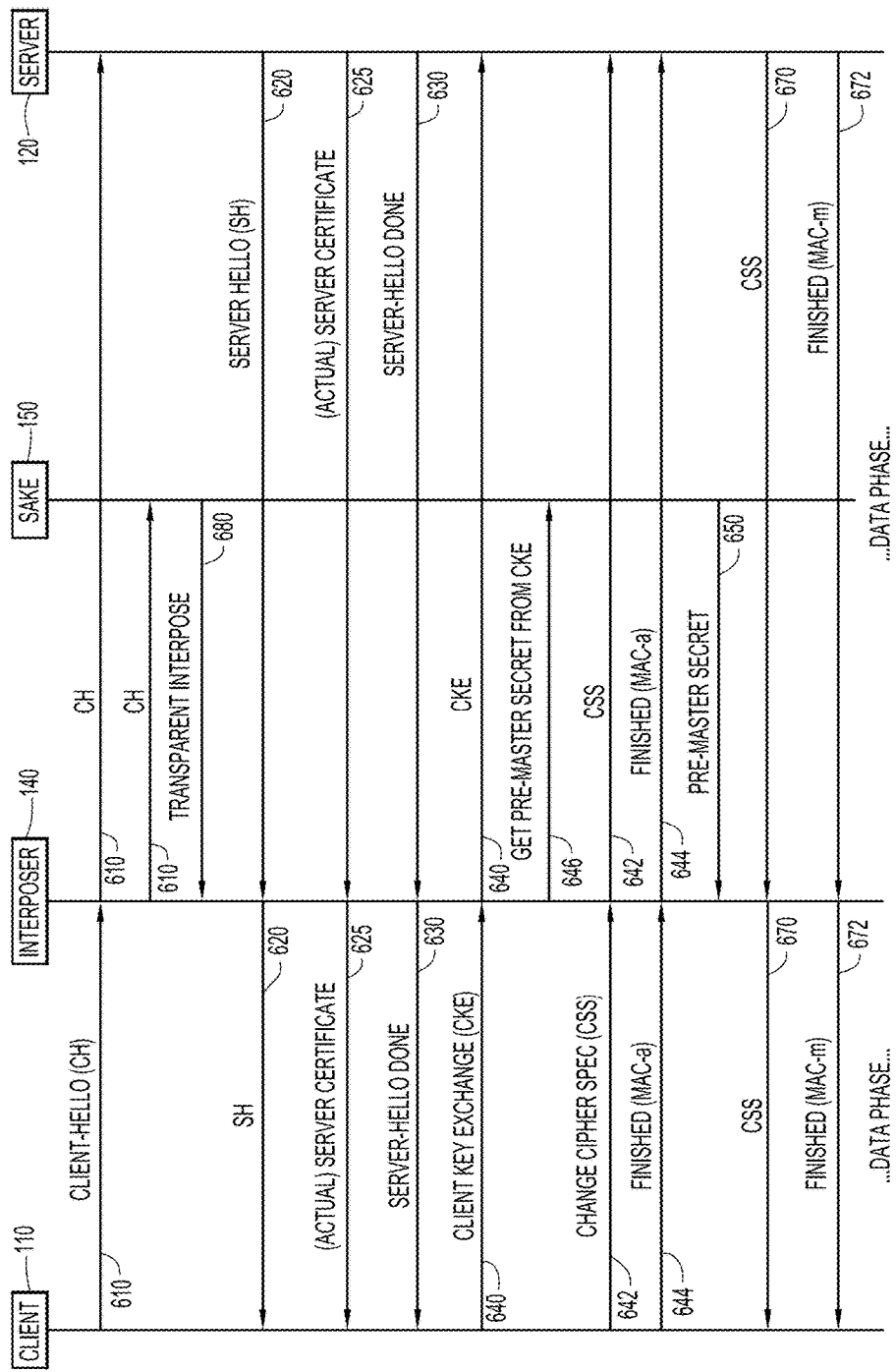
FIG. 6B is a ladder diagram showing steps according to an example embodiment of a transparent interposer in a session secured with an SSL/TLS-RSA security protocol.
Figure 7:
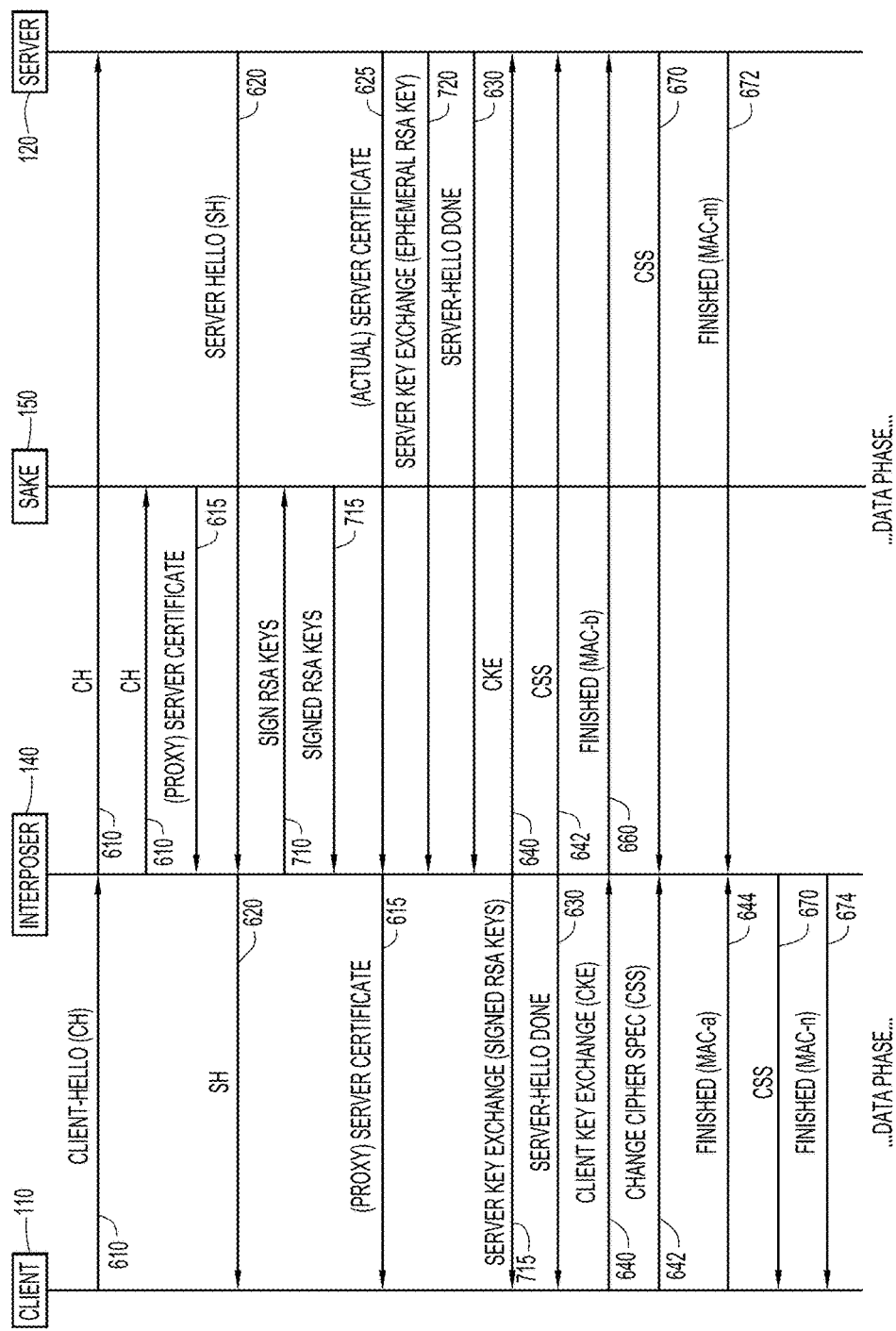
FIG. 7 is a ladder diagram showing steps of an active interposer in a session secured with a SSL/TLS-ephemeral RSA security protocol according to an example embodiment.

Referring now to FIG. 6B, a ladder diagram for an RSA/SSL handshake for a transparent proxy interposer is shown. The client initiate the handshake with the same CH message 610 as described for the active interposer example of FIG. 6A. However, the SAKE 150 responds with message 680 that directs the interposer 140 to act as a transparent interposer, and does not return a proxy server certificate. The interposer 140 forwards all of the messages (e.g., SH message 620, server certificate 625, SH Done message 630, CKE message 640, CSS message 642, Finished (MAC-a) message 644, CSS message 670, and Finished (MAC-n between the client 110 and the server 120 without any changes. the actual server certificate 625 and the Server-Hello message 630 from the server 120 to the client 110.

When the interposer 140 receives the CKE message 640, which includes the encrypted Pre-Master secret, from the client 110, it forwards the encrypted Pre-Master secret to the SAKE 150. In the transparent mode, the interposer 140 may request decryption of the Pre-Master secret in parallel with forwarding the handshake messages to the server. This allows reduction of any latency impact on the client-server handshake.

In one example, the interposer 140 may have a separate Pre-Master secret for the session with the server 120. In this example, the handshake will not complete before both master secrets are available at the interposer 140. This will allow the interposer 140 to move away from being a transparent interposer to being an active interposer. In examples in which the interposer 140 uses a separate Pre-Master secret for SSL sessions with the server 120 and the client 110, the MAC address for the Finish message 672 will not be the same. There may be various security reasons to have separate Pre-Master secrets for the SSL session between the client 110 and the interposer 140, and for the SSL session between the interposer 140 and the server 120. The master secrets may be the same or separate, and a user may configure this option.

In another example, an Ephemeral RSA handshake may be used for an active proxy interposer. After the Server-Hello message 620 is sent, the interposer 140 knows whether Ephemeral RSA is the chosen cryptographic method. The interposer 140 sends its own Ephemeral RSA Key to the SAKE 150. The SAKE 150 uses the appropriate private key to sign the Ephemeral RSA Key and send it back to the interposer 140. The SAKE 150 may generate an Ephemeral key, and send the signed public key as well as the private key to the interposer 140 when requested. The interposer 140 can then use that key pair for communication with the server 120. The remaining handshake messages are like any other SSL handshake messages in active proxy mode.

In yet another example, a Diffie-Hellman (DH) Digital Signature Standard (DSS) handshake may be used for an active or transparent proxy interposer. In this example, the server certificate contains a DH key and group (p,g) that are signed (with DSS) by a CA. The SAKE 150 derives the shared pre-master secret using the DH proxy certificate private key, proxy certificate DH group (p,g), and the client public DH key.

In still another example, an Ephemeral DH (DHE) DSS handshake may be used for an active proxy interposer. In this example, the SAKE 150 has the DSS certificate private key to sign the server key exchange message towards client. In the DHE handshake, the server key exchange message is signed with the DSS long term private key. The message contains the interposer short term DH key and group [p,g]. In an Ephemeral DH, the server is generating a dynamic DH key which is not pre-known. To support this mode transparently, the server 120 may communicate, securely and dynamically as needed, the DH private keys to the SAKE 150 as they change.

An EDH RSA handshake may be implemented that is similar to EDH DSS handshake, with the difference being the signing key of the Server Key Exchange message. In an EDH DSS handshake, the signing key is a DSS signing key. In an EDH RSA handshake, the signing key is an RSA private key.

In a further example, an Elliptical Curve Diffie-Hellman (ECDH/ECDHE) handshake may be used for an active proxy interposer. In this example, the interposer 140 is capable of understanding optional client hello extensions that indicate the set of elliptic curves supported by the client and the set of point formats that the client can parse. In one example, the opaque extension data field comprises EllipticCurveList and ECPointFormatList to indicate this data. The Supported Point Formats Extension is included in a Server-Hello message, in response to a Client-Hello message containing the Supported Point Formats Extension when negotiating an elliptic curve cryptography (ECC) cipher suite. The remainder of the handshake messages may be handled in a manner similar to the standard DH scheme.

In one example, active proxy interposing can be supported by both ECDH and ECDHE key exchange schemes, while only an ECDH scheme can support transparent proxy interposing. The message sequence is similar to a standard DH scheme.

Figure 8:
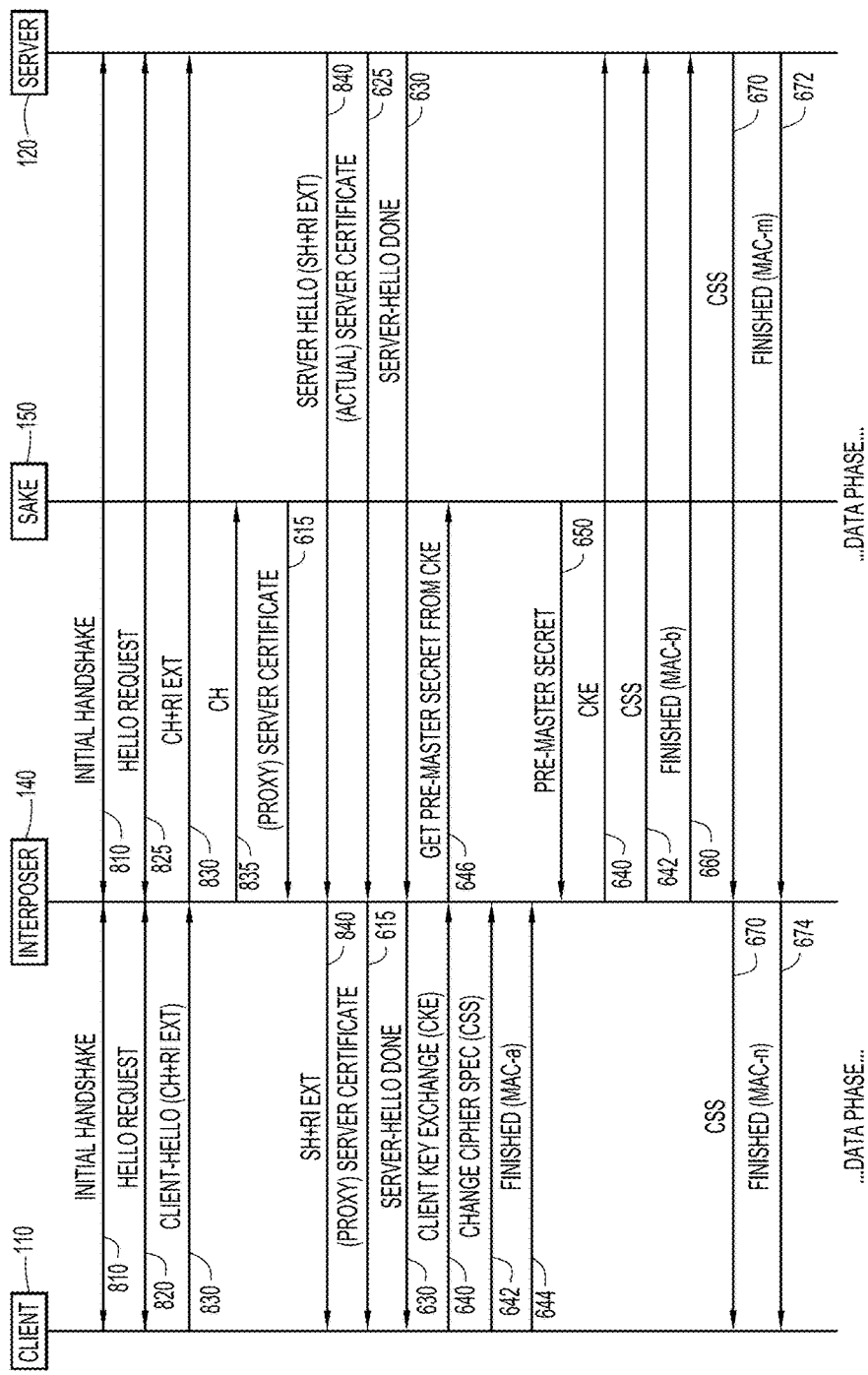
FIG. 8 is a ladder diagram showing steps of an active interposer in a re-handshake session secured with an SSL/TLS security protocol according to an example embodiment.

Referring now to FIG. 8, a ladder diagram for an SSL Secure Re-Handshake for an active proxy interposer is shown. In some examples, clients and a server may support secure renegotiation by saving client/server verifying data from the Finished message of the immediately previous handshake 810, e.g., Finished message 644 and Finished message 672 shown in FIG. 6A. The client verifying data sent from the client and the server verifying data sent from the server may be stored on the interposer. The client 110 may send a Hello request message 820 to request a renegotiation handshake. Alternatively, the server 120 may send the Hello request message 825.

In response to a Hello request message, the client 110 sends a Client-Hello message 830, which includes a Renegotiation Information (RI) extension. The interposer 140 validates the client's RI extension with the client verifying data saved from the previous handshake, and forwards the CH and RI information in message 830 to the server 120. The interposer also forwards the CH message 835 without the RI extension to the SAKE 150 and receives a proxy server certificate in message 615. The server 120 sends a Server-Hello message 840, which includes the server's RI extension. The interposer 140 validates the server's RI extension with the server verifying data saved form the previous handshake, and forwards the SH and RI information to the client 110. The remainder of the handshake proceeds as a normal handshake, e.g. as described with respect to FIG. 6A. While only the active proxy interposer case has been described, a similar SSL Re-Handshake may be performed for a transparent proxy interposer.

Referring now to FIG. 9A, a ladder diagram for an SSL Resumption handshake for an active proxy interposer is shown. Session resumption between the client 110 and the interposer 140 is independent of session resumption between the interposer 140 and the server 120. In one example, two caches will be maintained on the interposer 140 for the purpose of client-server session caching: a client-side cache and a server-side cache. The client-side cache may be hashed based on session IDs. The server-side cache may be hashed based on the destination server IP, destination server port, and cipher suite. Client 110 sends a CH message 910 that includes a session ID, e.g., ID1. The interposer 140 queries the client-side cache with ID1, and finds the cipher of the cached session. The interposer 140 then queries server-side cache based on the destination server IP, destination server port, and cipher suite, and find the interposer-server session with a session ID of ID2. The interposer 140 sends a CH message 915 that includes the session ID of ID2. If the resumed handshake with the server 120 succeeds, the server 120 sends a SH message with ID2 to resume the handshake with the interposer 140. If the server 120 chooses not to reuse ID2, then a full handshake with the server 120 is initiated with a session ID of ID3 (not shown in FIG. 9A). If the server 120 agrees to resume the session, or if the cipher suite chosen by the server 120 is the same as the cipher suite used for session ID1, then the interposer 140 will send SH message 925 with ID1 to resume the session with the client 110. If the cipher suite of ID3 and ID1 are different, then the interposer 140 may generate a new session ID, e.g., ID4, and a full handshake will be performed with the client 110 using the same cipher suite as ID3. The remaining messages of the handshake for the session resumption are the same as described with respect to FIG. 6A

To support session resumption, either the interposer 140 or the SAKE 150 will provide session caching. Since the SAKE 150 is not part of the SSL session, typically the interposer 140 will maintain the session cache. Additionally, adding a session cache in the interposer 140 may reduce latency by eliminating an unnecessary round trip between the interposer 140 and the SAKE 150 to access session cache information. While FIGS. 9A and 9B show the SAKE 150, it is not actively involved in the session resumption handshake. If the session key computation and storing is done at the SAKE 150, the interposer 140 will send the resumed SSL session identifier to SAKE 150, and the SAKE 150 will return the session key to the interposer 140 for the interposer 140 to compute the connection SSL state based on the session key, client random number, and server random number.

Referring now to FIG. 9B, a ladder diagram for an SSL Resumption handshake for a transparent proxy interposer is shown. For transparent interposing, the interposer 140 can maintain a single session cache based on session ID instead of using two caches as in the active proxy interposer case, since the session ID will not change in the CH or SH messages. The client 110 sends a CH message 910 with a session ID of ID1, and the interposer 140 forwards the CH message 910 to the server 120. If the server 120 accepts the session resumption, it will send a SH message 925 with a session ID of ID1, and the rest of the handshake follows in a similar manner as described with respect to FIG. 6B. If the server 120 chooses not to use a session ID of ID1, it will return a different session ID in the SH message and a full handshake will be initiated (not shown in FIG. 9B).

Figure 10A:
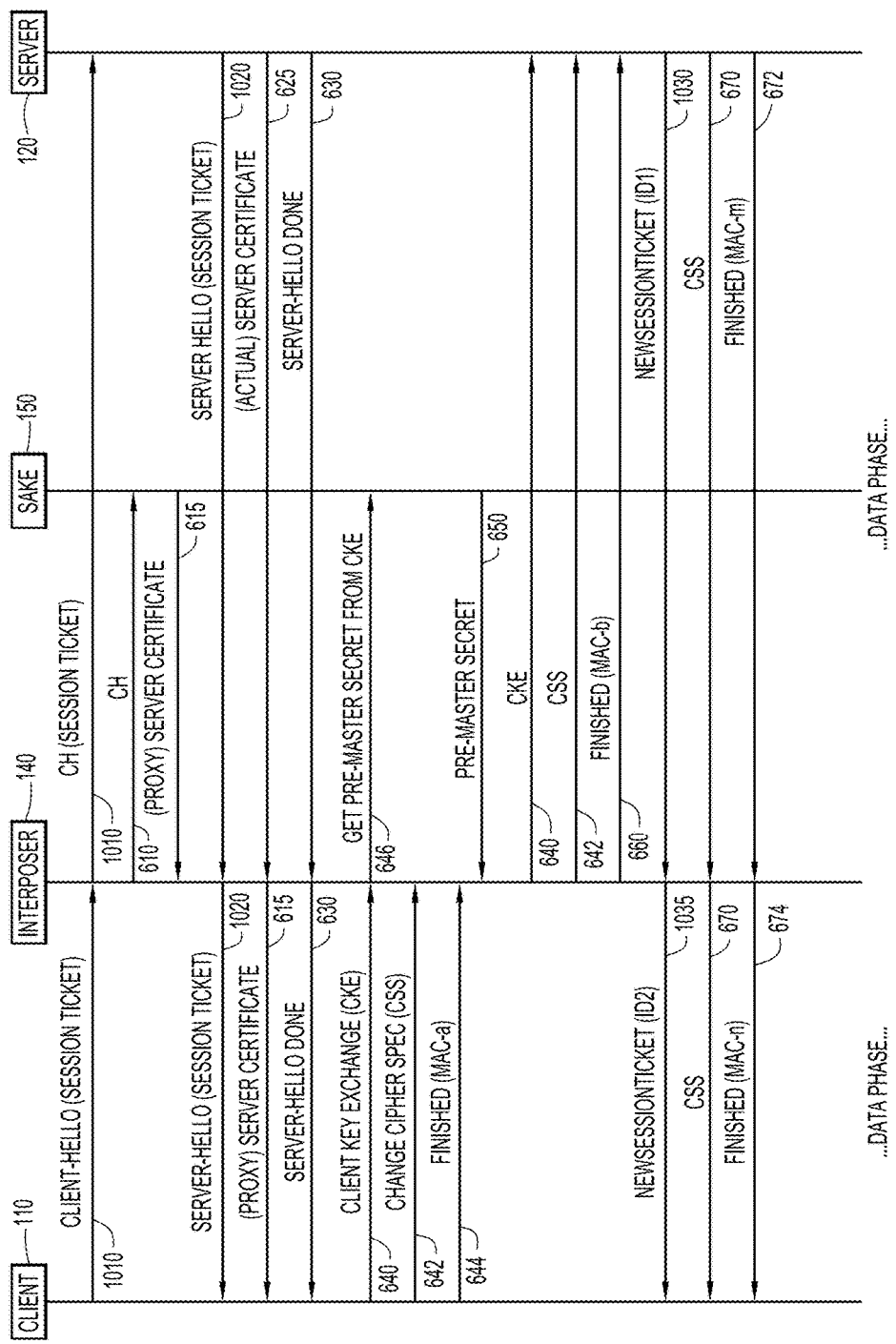
FIG. 10A is a ladder diagram showing steps of an active interposer setting up a session ticket for a session secured with an SSL/TLS security protocol according to an example embodiment.
Figure 11:
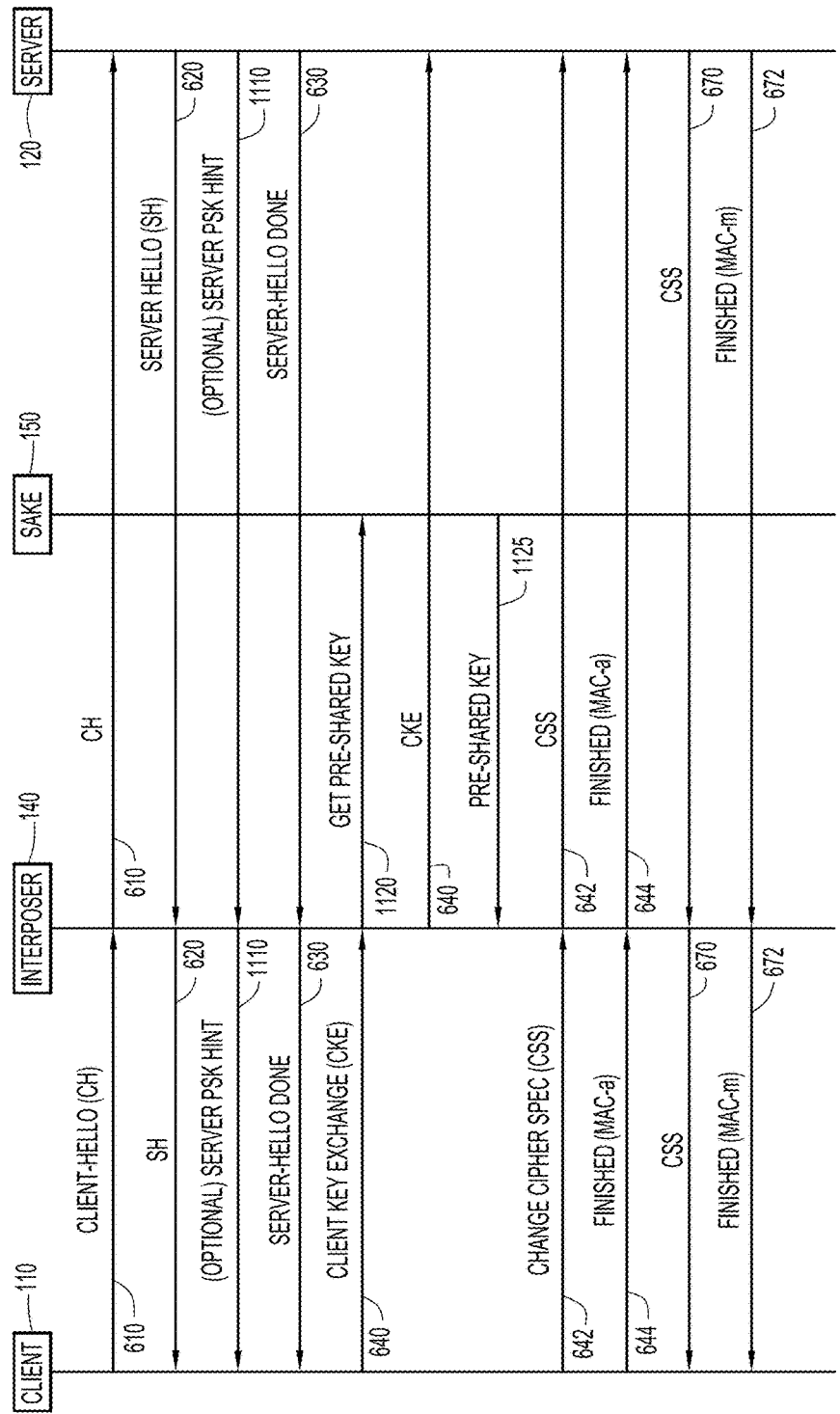
FIG. 11 is a ladder diagram showing steps of a transparent interposer in a session secured with a TLS-Pre-Shared Key (PSK) security protocol according to an example embodiment.

Referring now to FIG. 10A, a ladder diagram for SSL Resumption using a Session Ticket Extension handshake for an active proxy interposer is shown. This extension is to provide a mechanism that enables a TLS server to resume sessions and avoid keeping per-client session states. Client 110 sends a CH message 1010, which includes an empty Session Ticket, to the interposer 140 and the interposer forwards the message 1010 to the server 120. The interposer 140 also sends the CH portion of the message to the SAKE 150 and receives a proxy server certificate in return, as described with respect to FIG. 6A. The server 120 sends a SH message 1020, which includes an empty Session Ticket, to the interposer 140, and the interposer 140 forwards the SH message 1020 to the client 110. The handshake proceeds as described with respect to FIG. 6A with one exception. After the server receives the Finished message 660 from the interposer 140, it sends a New Session Ticket message 1030 with a session ID of ID1. The interposer 140 stores the New Session Ticket from the server 120 and generates a second New Ticket Session message 1035 with a session ID of ID2. The interposer 140 sends the New Ticket Session message 1035 with a session ID of ID2 to the client 110.

In one example, the interposer 140 may provide the capability to generate a ticket storing the session state for client-interposer session and send the corresponding New Session Ticket 1035 to the client 110. The ticket should be encrypted and integrity-protected by a key. If the interposer 140 does not own a key for this, it will access the SAKE 150 to encrypt the ticket. The client 110 caches this ticket along with the master secret and other parameters to enable it to resume a session with the ticket.

Figure 10B:
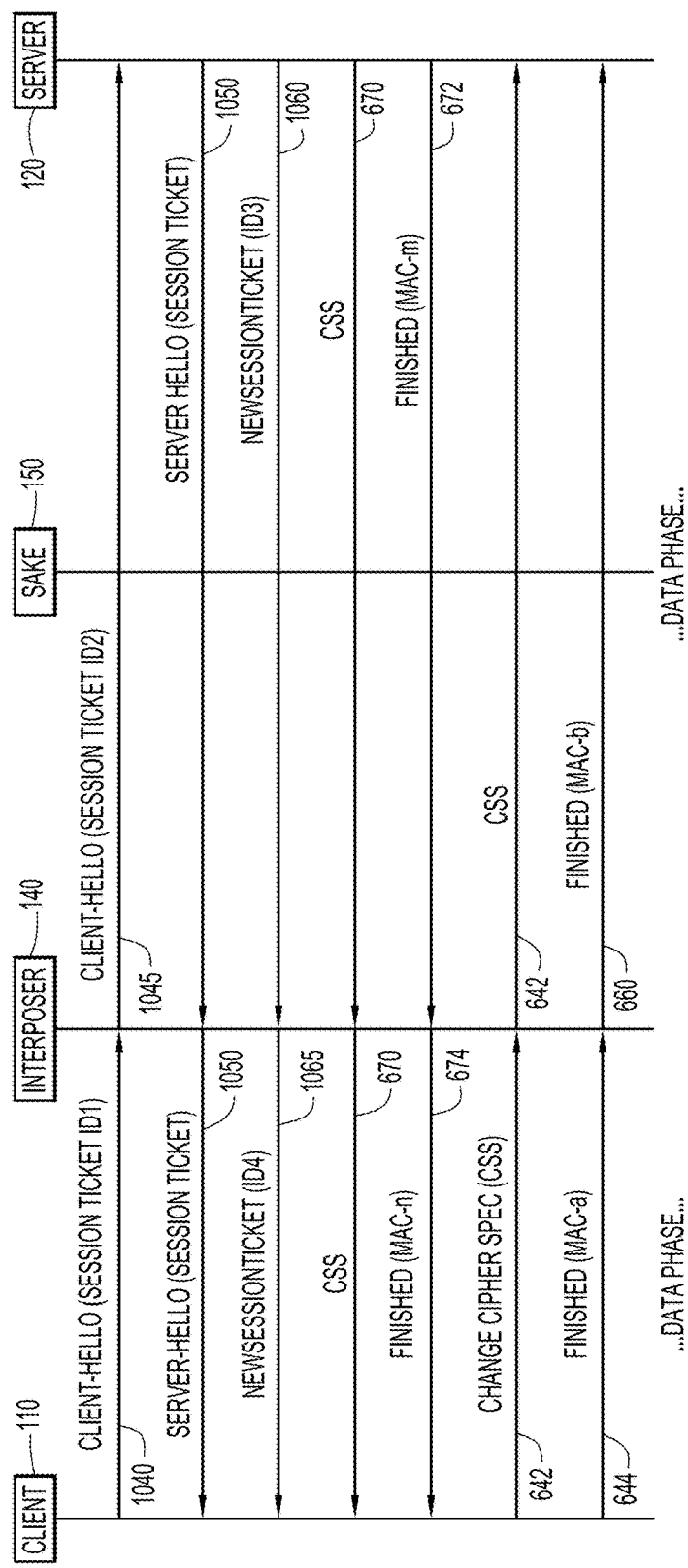
FIG. 10B is a ladder diagram showing steps of an active interposer using a session ticket to resume a session secured with an SSL/TLS security protocol according to an example embodiment.

Referring now to FIG. 10B, a ladder diagram for a Session Ticket Extension handshake for an active proxy interposer resuming a session is shown. When client 110 wants to resume a session, it includes the ticket in the Session Ticket extension within the CH message 1040. The CH message 1040 includes the Session Ticket for session ID1 between the client 110 and the interposer 140. The interposer 140 decrypts and verifies the ticket (possibly with the assistance of the SAKE 150), and finds the session ticket for the corresponding interposer-server session with a session ID of ID2. The interposer 140 forwards a CH message 1045 that includes the Session Ticket with a session ID of ID2. The server 120 decrypts and verifies the session ID2 ticket and replies with a SH message 1050 that includes an empty Session Ticket. The interposer 140 forwards the SH message 1050 to the client 110. After the SH message 1050, the server 120 sends a New Session Ticket 1060 with a session ID of ID3, which the interposer 140 stores. Similarly, the interposer 140 renews its ticket for the client-interposer session by sending a New Session Ticket message 1065 with a session ID of ID4.

If the server 120 cannot or does not want to honor the ticket, it will send a SH message without including a Session Ticket, which will initiate a full handshake with the client 110 (not shown in FIG. 10B). A transparent interposer 140 will forward the CH message 1040 with the same ticket information from the client 110 to the server 120, and forward the New Session Ticket message 1060 from the server 120 to the client 110.

Referring now to FIG. 11, a ladder diagram for a TLS Pre-Shared Key (PSK) handshake for a transparent proxy interposer is shown. The client 110 sends a CH message 610 that indicates a PSK ciphersuite. The server 120 responds with a SH message 620, and optionally sends a PSK hint message 1110. After receiving the CKE message 640, which includes a PSK identity, the interposer 140 sends a request 1120 to the SAKE 150 for the pre-shared key. The SAKE 150 replies to the request with message 1125 containing the pre-shared key. The remaining messages in the handshake are similar to the messages described with respect to FIG. 6B.

In one example, a DHE-PSK handshake may be used to augment the security of the PSK handshake. In this example, the message 1110 may contain a PSK identity hint, but also includes server DH parameters (e.g., prime modulus, generator, public value). The CKE message from the client 110 contains the PSK identity and the client DH parameters (e.g., public value). The Pre-Master secret may be calculated by the interposer 140 or the SAKE 150 using the DH secret key and the PSK.

In another example, an RSA-PSK Key Exchange handshake may be used for an active proxy interposer or a transparent proxy interposer. In this example, the CKE message from the client 110 includes the PSK identity and the encrypted Pre-Master secret. The Pre-Master secret may be calculated using the encrypted Pre-Master secret and the PSK.

In yet another example, a Kerberos TLS handshake may be used for a transparent proxy interposer. In this example, the CH message from the client 110 includes the Kerberos ciphersuites. The CKE message from the client 110 includes the Kerberos service ticket encrypted by the server private key, the Pre-Master secret encrypted by the service session key, and may optionally contain an authenticator encrypted by the service session key. In this example, the SAKE 150 has access to the server private key in order to get the service session key from the service ticket.

Windows Active Directory (Win-AD)

An AD solution relies on the interposer to deliver, to the SAKE application protocols, GSSAPI authentication tokens. The SAKE processes the authentication tokens by retrieving, from the AD Domain Controller (DCtl), proper Pre-Shared Keys (PSKs) and sends the application security protocol session state back to the interposer.

AD security protocols (e.g., NTLM and KRB) are PSK based security protocols. The security session state is derived from security protocol handshake messages together with a pre-known-shared-key/secret. As used herein, the PSK in AD security protocols may be referred to as a private key. The pre-known secret is placed in an AD database and retrieved as part of the AD trust model realm. In one example, for NTLM, the PSK may be based on a hash of the user password. In another example, for KRB, the PSK may be the server private key, which is shared between the server and the KDC by allowing both to access an attribute in the AD database that belongs to a server account object. KRB typically has a Ticket Granting Service (TGS) session key used to encrypt connection secrets. The TGS key may also be referred to as a pre-master secret. NTLM typically uses a Key Exchange Key (KEK), which may also be referred to as a pre-master secret. The NTLM-KEK is transmitted between the server and the DCtl. The SAKE may have logic to derive the NTLM-KEK based on the handshake tokens and the obtained PSK.

Figure 12A:
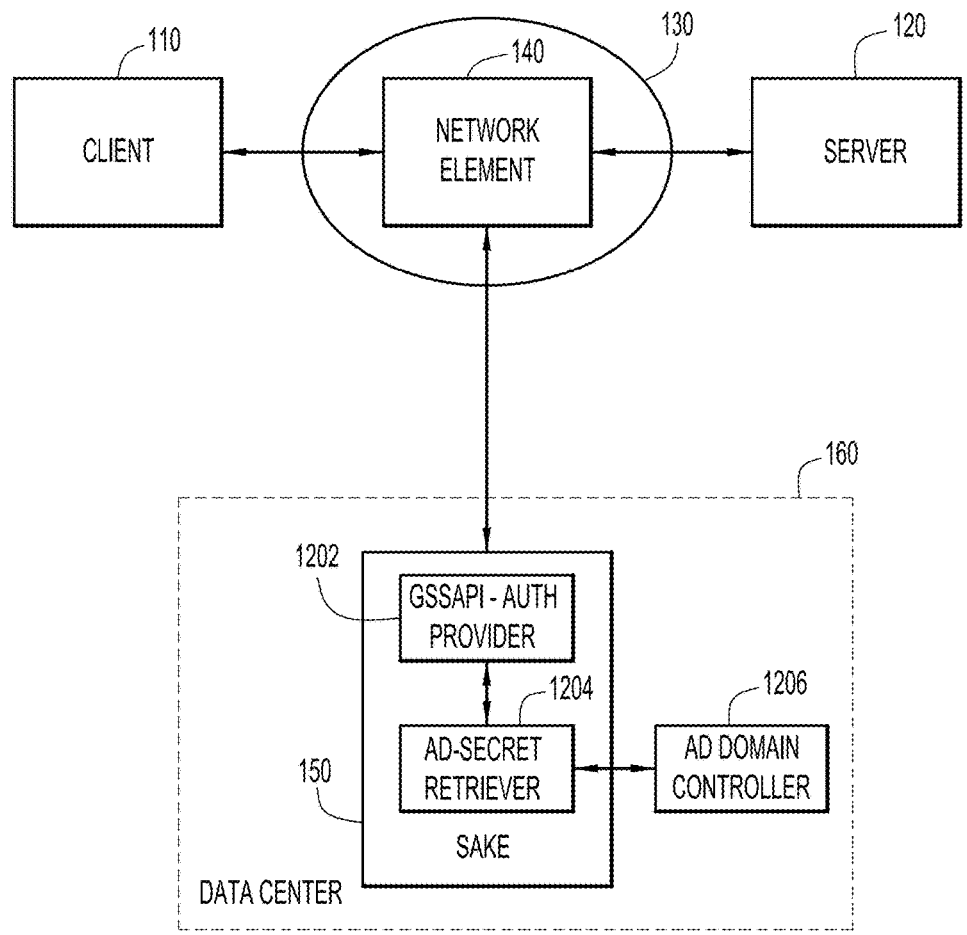
FIG. 12A is a system block diagram showing an interposer in a Windows-Active Directory (WIN-AD) session between a client and a server according to an example embodiment.

Referring now to FIG. 12A, a simplified block diagram configured to interpose in a Win-AD session is shown. The client 110 accesses a Win-AD service from server 120 over network 130. The network 130 comprises at least one network element 140 configured to act as an interposer in the Win-AD session. The interposer 140 communicates with SAKE 150 in data center 160. The SAKE 150 is configured to assist the interposer 140 in a Win-AD session with module 1202 for providing GSSAPI authentication tokens and module 1204 for retrieving secret information from the AD Domain Controller (DCtl) 1206. In one example, the DCtl 1206 is maintained in the data center 160. Alternatively, the DCtl 1206 may be maintained in a separate facility with a secure link to the SAKE 150.

In one example, a SAKE configured to assist in Win-AD interposing may be configured with an AD domain account, e.g., a domain identity, which may be a user account or a machine account in the AD. This account belongs to the AD resource tree that the PSK is derived from. The SAKE will be granted the proper permissions in the AD to retrieve the application security protocol PSK. The SAKE domain identity may provide the proper permissions for the SAKE to retrieve the PSK. The domain identity may derive its queries based on the application security protocol handshake tokens. The application security protocol handshake tokens contain values for the queries and provide a link between the handshake, the domain identity, and the PSK. Using the domain identity allows the SAKE 150 to come up with the proper secret for the session. The secret may be cached in the SAKE 150 for future security application session handshakes needing the same secret. The PSK may be stored in a temporary memory cache for the NTLM and Kerberos secrets.

The SAKE 150 may use module 1204 to obtain the secret data necessary for decrypting the authentication traffic between the client 110 and server 120. The secret data may be associated with the client 110 or the server 120 involved in the communication. Module 1204 is authenticated and authorized to operate in the security domain (Active Directory) to which the client and/or server belong. The Module 1204 uses a domain identity account with the necessary privileges to retrieve the secret key data. The account may be a regular user account or a machine account with minimal privileges to the AD database. The privilege itself may need to be provided explicitly by the AD administrator.

In one example, the secret data may be an attribute of the AD account object which is associated with the client or server. A subset of the Microsoft Directory Replication Service Remote (MS-DRSR) protocol may be used to retrieve the secret data associated with the account object. The SAKE may then decrypt, decode, and parse the account object data to extract the secret data and store the information for use by module 1202 in deriving the session state used in interposing into the session security.

In an example using Kerberos based encryption, the secret data is associated with the server account object. The SAKE uses the Service Principal Name (SPN) of the server, which is extracted from the authentication traffic, to identify the objects to be replicated from the AD. The SAKE, on replicating the server object, extracts the secret data from the attributes and caches the locally in a secure manner. The keys may then be provided on-demand to the interposing service.

In another example using NTLM based security, the secret data is associated with the client user account object. The SAKE uses the User Principal Name (UPN), which is extracted from the authentication traffic, to identify the object the secret data needs to be retrieved from the AD. The SAKE, on retrieving the AD user account object secret data keys from the attributes, caches them locally in a secure manner. These keys may then be provided to module 1202 to compute the session state to be provided to the interposer.

In some examples of AD environments, authentication, confidentiality, and integrity services are provided in the form of generic application programming interfaces (e.g., GSSAPI, or Security Support Provider Interface (SSPI)), which provide the option to use any available authentication mechanism. An SSPI may act as a common interface for various underlying Security Support Providers (SSPs), such as NT LAN Manager Security Support Provider (NTLMSSP), Kerberos-V, Simple and Protected GSSAPI Negotiation Mechanism (SPNEGO), and/or Credential Security Support Provider (Cred-SSP).

In one example, a GSSAPI/SSPI session may be divided into an authentication phase and a data phase. The authentication phase may comprise the initial communication between the client and server, including authentication packets exchanged to establish trust between the client and server as well as session security parameters to be used for secure messaging in the data phase. The data phase follows the authentication phase and allows the client and server to exchange application protocol data packets in a secure fashion in accordance with the security protocol characteristic and GSSAPI/SSPI security service provider used.

For interposing into GSSAPI/SSPI session security, the interposer will obtain the session security state of the client and server. The client or server secret is needed to open packets exchanged in the authentication phase to deduce the session keys. The interposer does not hold these secrets and will be aided by the SAKE to perform the operations to handle handshake tokens or deriving the session state based on the client/server PSK secrets.

In one example for transparent interposing, the interposer does not perform any authentication of the client, leaving that responsibility to the server. A transparent interposer does not modify authentication tokens. If the server accepts the client for the data phase, so will the interposer. Alternatively, for active interposing, the interposer performs authentication of the client before interposing on its behalf toward the server. In this example, it is the responsibility of the interposer to make sure only properly authenticated client will be proxied by the interposer on behalf of the client using the KCD.

Figure 12B:
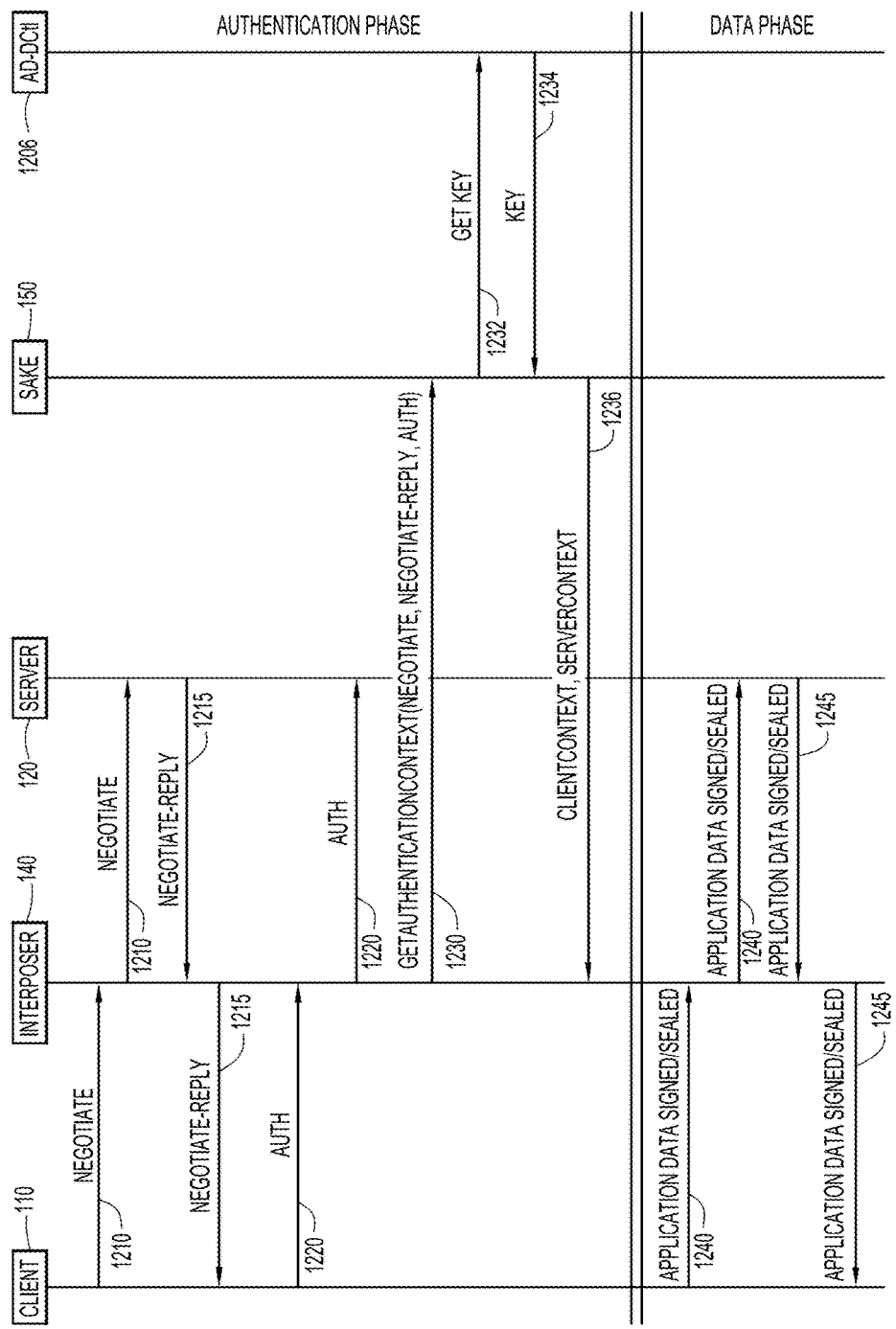
FIG. 12B is a ladder diagram showing steps of a transparent interposer in a Win-AD session according to an example embodiment.

Referring now to FIG. 12B, a ladder diagram for Win-AD MS-KRB/MS-NTLM client authentication (RSA/DSS) handshake for a transparent proxy interposer is shown. Initially, the client 110 sends a session negotiation message 1210 (e.g., NTLM-NEGOTIATE, KRB-APREQ) through interposer 140 to the server 140. In response, the server 140 sends a negotiation reply message 1215 (e.g., NTLM-CHALLENGE, KRB-APREP), through the interposer 140 to the client 110. Following the negotiate reply message 1215, the client may send an authentication message 1220 (e.g., NTLM-AUTHENTICATE) through the interposer 140 to the server 120. The interposer 140 saves a copy of the negotiation message 1210, the negotiation reply message 1215, and optionally the authentication message 1220, for later use with the SAKE 150.

After the client and server have successfully negotiated the secure session, the interposer 140 sends a message 1230 to the SAKE 150 in order to get valid contexts to inspect the messages passed in the data phase between the client 110 and the server 120. The message 1230 may comprise some or all of the negotiate message 1210, the negotiate reply message 1215, and the authentication message 1220. Using the information in message 1230, the SAKE 150 sends a request 1232 to the AD-DCtl 1206 for a private key associated with the session. The AD-DCtl 1206 returns the requested key to the SAKE 150 in message 1234. The SAKE 150 uses the key from message 1234 to generate a client context and a server context and sends the contexts to the interposer 140 in message 1236. Using the client context and server context for the session, the interposer 140 is able to unwrap any messages passed between the client and server in the secure session.

In one example using an NTLM security protocol, the client 110 sends an NTLM NEGOTIATE message 1210 to the server 120, which is transparently intercepted by the interposer 140. The interposer 140 saves a copy of the NTLM NEGOTIATE message and forwards it unmodified to the server 120. Upon receiving the NTLM NEGOTIATE message, the server 120 generates the NTLM CHALLENGE message 1215 that includes a nonce and sends it to the client 110. The NTLM CHALLENGE message 1215 is transparently intercepted by the interposer 140, which saves a copy and forwards it unmodified to the client 110.

Upon receiving the NTLM CHALLENGE message 1215, the client 110 generates an NTLM AUTHENTICATE message 1220, which includes the user name, domain name, challenge response, and encrypted session key using its UserKey. The client 110 sends the NTLM AUTHENTICATE message 1220 to the server 120, and it is transparently intercepted by the interposer 140. Since the UserKey itself is not transmitted, the interposer does not have access to it, and relies on the SAKE 150 to retrieve a copy from the AD-DCtl 1206.

The interposer 140 saves a copy of the NTLM AUTHENTICATE message 1220 and forwards it unmodified to the server 120. Upon receiving the NTLM AUTHENTICATE message 1220, the server 120 is able to verify the authenticity of the client 110 by standard methods of authentication (e.g., NetLogOn/SamLogOn RPC) with the AD-DCtl 1206. The server 120 is ready for the data phase upon successful authentication. However, since, the interposer 140 does not have the proper client and server contexts to unwrap messages in the data phase, it holds off traffic between the client 110 and the server 120.

The interposer 140 also sends an NTLMAuthenticationContext message 1230 to the SAKE 150. The message 1230 includes the saved copies of the NTLM NEGOTIATE message 1210, the NTLM CHALLENGE message 1215, and the NTLM AUTHENTICATE message 1220.

Upon receiving the GetNTLMAuthenticationContext message 1230, the SAKE 150 sends a GetUserKey (UPN) message 1232 to the AD-DCtl 1206 to request the UserKey for the User Name sent by the client 110. Upon successfully receiving the UserKey in message 1234, the SAKE 150 is able to compute NTLM Client and Server Contexts using the NTLM NEGOTIATE message 1210, NTLM CHALLENGE message 1215, and NTLM AUTHENTICATE message 1220. The SAKE 150 sends the NTLM Client and Server Authentication Contexts to the interposer 140 in message

1236. Upon successfully receiving and importing the NTLM Client and Server Contexts, the interposer 140 is ready for the data phase.

In the data phase, the client 110 sends application data message 1240 that is NTLM signed/sealed. The interposer 140 forwards the signed/sealed message 1240 to the server 120, but is also able to unwrap message 1240 since the interposer 140 has an NTLM Server Authentication Context. Similarly, server 120 sends application data message 1245 that is NTLM signed/sealed. The interposer forwards the signed/sealed message 1245 to the client 110, but is able to unwrap the message 1245 since the interposer 140 has an NTLM Client Authentication Context.

In an example using the Kerberos security protocol, the client 110 sends a Kerberos authentication token as part of an AP_REQ authentication message 1210 piggy backing with the first application request. On receiving the AP_REQ authentication message 1210, the interposer 140 makes a local copy of the authentication token and forwards the message 1210 to the server 120. The server responds with an AP_REP authentication message 1215 as part of the authentication handshake. On receiving the AP_REP authentication message 1215, the interposer 140 makes a local copy of the embedded authentication token and forwards the message 1215 to the client 110.

The interposer 140 also sends the AP_REQ and AP_REP authentication tokens to the SAKE 150 over a secure SSL channel and requests for a Kerberos authentication context for the client connection in message 1230. In one example, all of the processing of the tokens is completed in the SAKE 150. The SAKE 150 would mimic the server and client behavior to set up the KerberosServerContext and KerberosClientContext, respectively. Alternatively, e.g., to improve latency when the link between the interposer 140 and the SAKE 150 has a high latency, the SAKE 150 may return to the interposer 140, a decrypted service ticket sent by the client 110. The interposer 140 may build the KerberosServerContext and KerberosClientContext on its own and proceed to the data phase.

Upon receiving the tokens, the SAKE 150 retrieves the service information from them and sends a request 1232 to AD-DCtl 1206 for the long-term service key for server 120. The SAKE 150 authenticates itself to the AD-DCtl 1206 using a domain identity with the appropriate permissions. The communication with the AD-DCtl 1206 is an authenticated, authorized, and encrypted communication. The AD-DCtl 1206 responds to the SAKE 150 with the service key in message 1234. The SAKE 150 uses the service key to process the tokens and creates the Kerberos client and server security contexts. The SAKE exports the Kerberos client and server security contexts and sends them to the interposer 140 in message 1236.

Upon receiving the security contexts, the interposer 140 imports them, and establishes a client Kerberos security context and a server Kerberos security context. The Interposer is then able to process the Kerberos signed/sealed protocol data in messages 1240 and 1245 during the data phase.

Figure 12C:
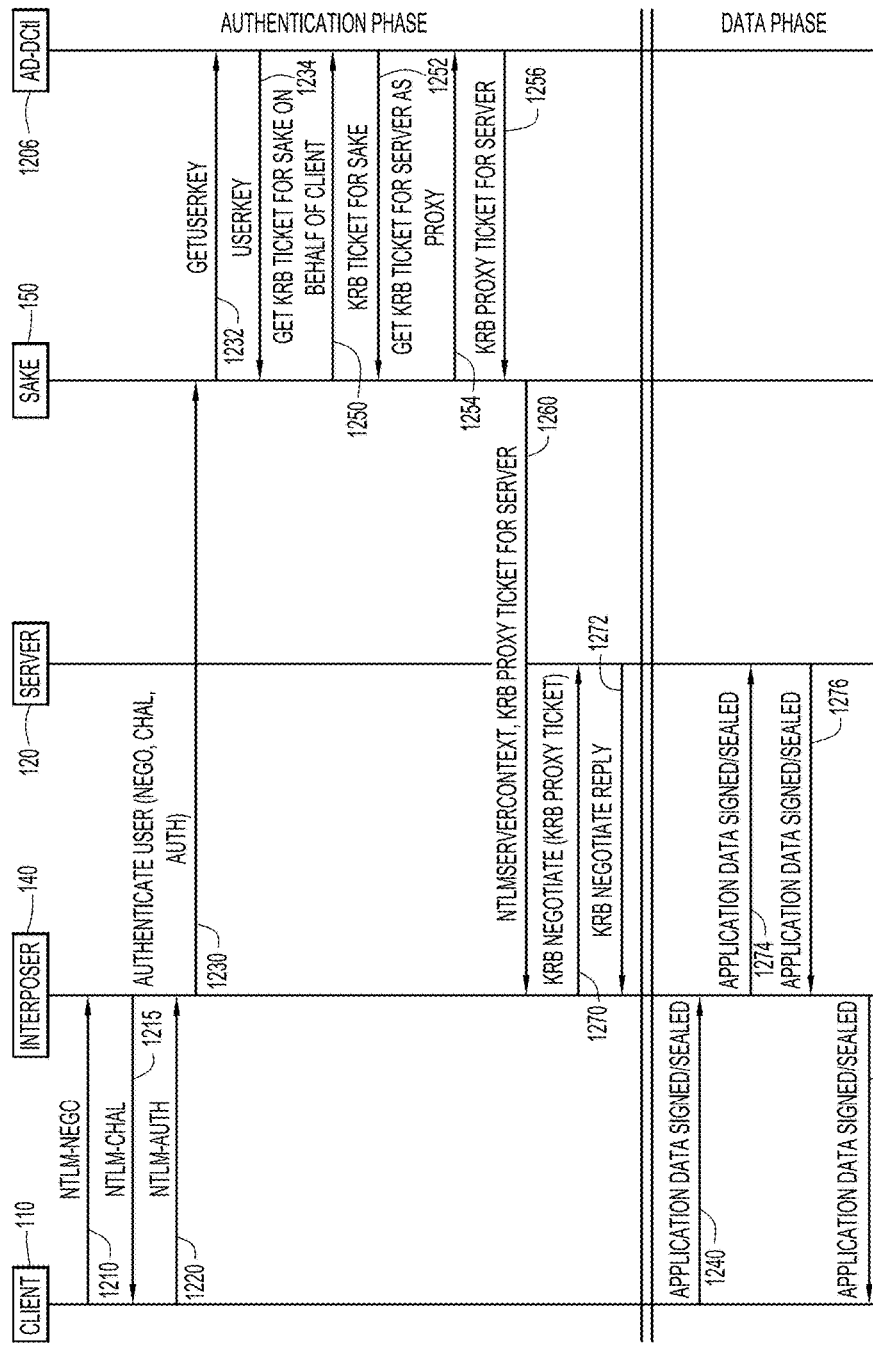
FIG. 12C is a ladder diagram showing steps of an active interposer in a Win-AD session initiated by the client with Windows NT LAN Management (NTLM) security protocols according to an example embodiment.

Referring now to FIG. 12C, a ladder diagram for Win-AD MS-NTLM client authentication (RSA/DSS) handshake for an active proxy interposer is shown. The client 110 sends an NTLM-NEGOTIATE message 1210 intended for the server 120. The interposer 140 intercepts the message 1210 and generates and responds to the client 110 with an NTLM-CHALLENGE message 1215 without forwarding the message 1210 to the server 120. The interposer also retains a copy of both messages 1210 and 1215. The client 110 generates an NTLM-AUTHENTICATE message 1220 and sends it toward the server 120. The interposer intercepts the NTLM-AUTHENTICATE message 1220 and sends all three tokens from messages 1210, 1215, and 1220 to the SAKE 150 in message 1230.

In one example, the SAKE 150 does not use pass-through authentication to authenticate the user. The SAKE 150 mimics the authentication related computations performed that the AD-DCtl 1206 would use to authenticate the client 110. The SAKE 150 reads the User Principal Name (UPN) from the NTLM-AUTHENTICATE message and sends a request 1232 to the AD-DCtl 1206 for the User Key. The SAKE 150 receives the User Key in message 1234, authenticates the user and generates the NTLMServerContext.

The SAKE 150 populates the PA_FOR_USER using information from the NTLM-AUTHENTICATE message, and uses the Service For User to Self (S4U2Self) extensions to request a service ticket to itself on behalf of the user in message 1250. In one example, the S4U2Self operation only succeeds if the user information is valid. This may provide a secondary confirmation the user is valid. The AD-DCtl 1206 returns the requested service ticket in message 1252. The SAKE 150 uses the S4UProxy extension with the service ticket from message 1252 to send a request 1254 to the AD-DCtl 1206 for a ticket to application service provided by the server 120. The AD-DCtl 1206 replies to the SAKE 150 with message 1256 comprising the proxy service ticket AppSvcTktFromProxy.

The SAKE 150 exports the established NTLMServerContext and the AppSvcTktFromProxy to the interposer 140 in message 1260. The interposer 140 imports the NTLMServerContext and is ready to process traffic to and from the client 110. The interposer uses the service ticket AppSvcTktFromProxy to initiate a Kerberos handshake with the server 120 with message 1270. The server 120 responds with a KRB5-AP_REP message 1272 to complete the Kerberos handshake. At this point, the interposer 140 has an NTLMServerContext to process NTLM data packets from the client 110 and it has established a KRBServerContext to process Kerberos packets from the server 120.

During the data phase, the client 110 sends an NTLM secured message 1240 to the server 120. The interposer 140 intercepts the message 1240, removes the signing/sealing and processes the application data before signing/sealing the data with Kerberos and forwarding it to the server 120 in message 1274. The server 120 sends Kerberos signed/sealed data back to the client 110 in message 1276. The interposer 140 intercepts the Kerberos message 1276, removes the Kerberos security protocol, processes the application data, signs/seals the data with the NTLM security protocol, and sends the NTLM secured data to the client in message 1245.

In summary, in one example of an active interposer into an NTLM session, the SAKE receives a hash of the user's password, e.g., the NT One-Way Function (NTOWF) of the user's password, from the interposer. The hash is used to calculate a Key Exchange Key, and derive the NTLM security context of the server. Using the user information in the NTLM Authenticate message, the SAKE requests a KRB5 ticket to the target service on behalf of the client by using S4u2Self and S4u2Proxy extensions. The SAKE then transmits the NTLM security context and KRB5 service ticket to the interposer. This allows the interposer to establish NTLM and KRB security contexts and wrap/unwrap secured data between the client and server.

Figure 12D:
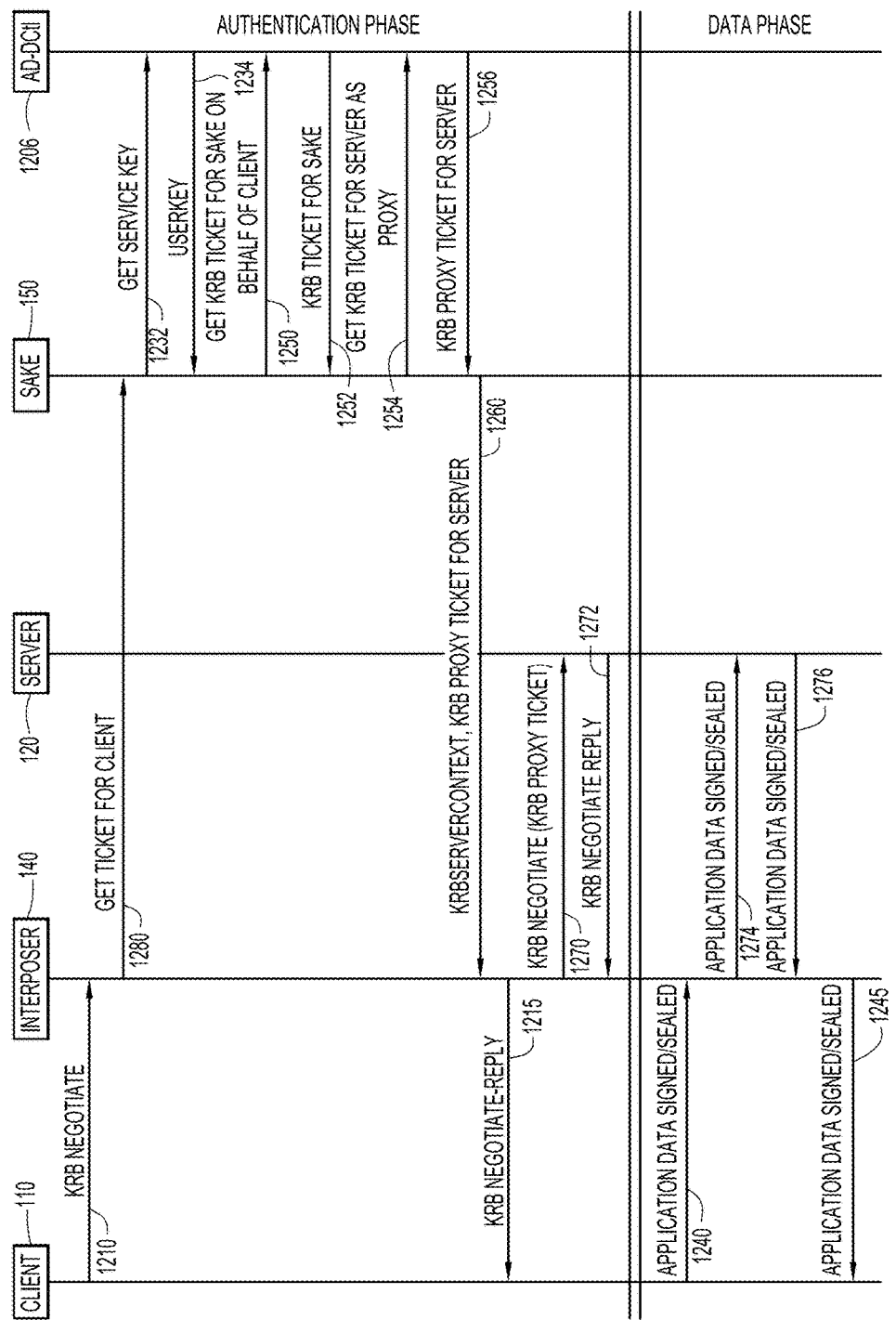
FIG. 12D is a ladder diagram showing steps of an active interposer in a Win-AD session initiated by the client with Windows Kerberos (KRB) security protocols according to an example embodiment.

Referring now to FIG. 12D, a ladder diagram for Win-AD MS-KRB client authentication handshake for an active proxy interposer is shown. The client sends a KRB5-

AP_REQ message 1210 to the server 120. The interposer 140 intercepts the message 1210 and includes it in a request 1280 sent to the SAKE 150, for a service ticket. The SAKE 150 extracts the Service Principal Name (SPN) from the KRB5-AP_REQ message and requests the long term service key for this service from the AD-DCtl 1206 in message 1232. The AD-DCtl 1206 returns the long term service key associated with the SPN in the AD schema to the SAKE 150 in message 1232.

The SAKE 150 uses the service key and decrypts the service ticket embedded inside the KRB5-AP_REQ, extracts the User Info from the service ticket and populates the PA_FOR_USER. The SAKE 150 then uses the S4U2Self extensions to send a request 1250 to the AD-DCtl 1206 for a service ticket to itself on behalf of the user. In one example, the SAKE 150 uses the service key of server 120 to decrypt the service ticket presented by the client in the AP_REQ message. This confirms that the user is authenticated with the AD-DCtl 1206 and possesses a valid ticket. The AD-DCtl 1206 returns the requested service ticket ProxySvcTktFromUser in message 1252.

The SAKE 150 uses an S4UProxy extension with the ProxySvcTktFromUser to sends a request 1254 for a ticket to the service provided by server 120. The AD-DCtl 1206 returns the AppSvcTktFromProxy to the SAKE 150 in message 1256. The SAKE 150 exports the established KerberosServerContext and the AppSvcTktFromProxy to the interposer 140 in message 1260.

The interposer 140 imports the KerberosServerContext and responds to the client 110 with message 1215 comprising the KRB5-AP_REP message. The interposer 140 is now ready to process Kerberos traffic to and from the client 110.

The interposer 140 uses the service ticket AppSvcTktFromProxy to initiate a Kerberos handshake with the server 120 with message 1270. The server 120 responds with a KRB5-AP_REP message 1272 to complete the Kerberos handshake. At this point, the interposer 140 has established a KRBClientContext to process Kerberos packets from the server 120.

During the data phase, the client 110 sends a Kerberos secured message 1240 to the server 120. The interposer 140 intercepts the message 1240, removes the signing/sealing and processes the application data before signing/sealing the data with Kerberos and forwarding it to the server 120 in message 1274. The server 120 sends Kerberos signed/sealed data back to the client 110 in message 1276. The interposer 140 intercepts the Kerberos message 1276, removes the Kerberos security protocol from the server side, processes the application data, signs/seals the data with the Kerberos security protocol from the client side, and sends the Kerberos secured data to the client in message 1245.

In summary, in one example of an active interposer into a KRB session, the SAKE receives the Service Long Term Service Key, and decrypts the KRB service ticket to obtain the underlying client/user information. With the user information from the KRB service ticket, the SAKE requests a KRB5 ticket to the target service on behalf of the client by using the S4u2Self and S4u2Proxy extensions. The SAKE transmits the KRB context and KRB5 service ticket to the interposer, which allows the interposer to use separate KRB security context with the client and with the server. This enables the interposer to wrap/unwrap secured data in the session between the client and the server.

Figure 13:
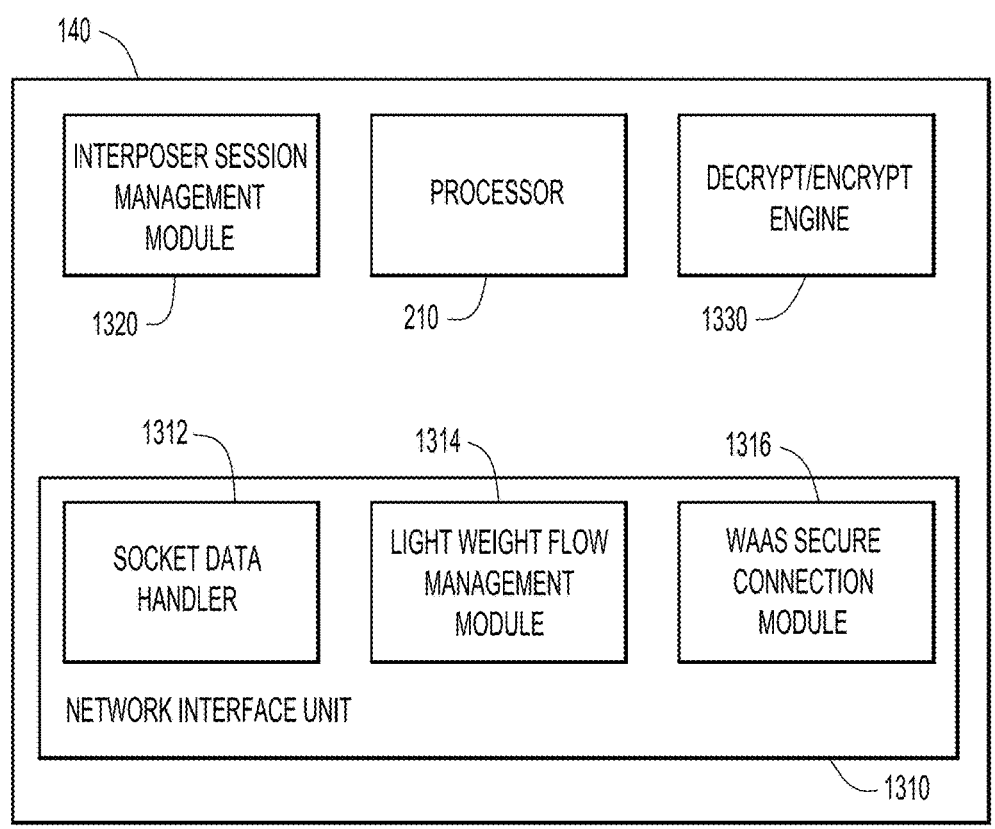
FIG. 13 is a simplified block diagram of an interposer according to another example embodiment.

Referring now to FIG. 13, a simplified block diagram of a network element 140 configured to serve as an interposing device for a WAAS is shown. The interposer 140 includes, among other possible components, a processor 210 to process instructions relevant to serving as an interposing device. The interposer 140 also includes a network interface unit 1310 to communicate packets data with network 130. The network interface unit 1310 includes a Socket Data Handler (SDH) 1312 that is responsible for data movement between the socket buffer and TCP stack, as well as between socket buffers and applications that may use the data from the interposer 140. The network interface unit 1310 also includes a Light Weight Flow Management Module (LWFM) 1314 configured to perform shallow parsing of SSL traffic, fast switching for the SSL traffic based on data or handshake messages, as well as the mode in which a flow is being processed, and copying SSL messages when needed. The network interface unit 1310 further includes a WAAS Secure Connection module 1316.

An Interposer Session Management Module (ISM) 1320 is responsible for running the SSL state machine for all of the SSL flows. Additionally, the ISM 1320 may direct the communication with the SAKE 150 to retrieve server certificates, and decrypt/encrypt/sign messages which requires the server's private key. A Decrypt/Encrypt Engine (D/E) 1330 provides a uniform API set to perform decryption/encryption operations. In one example, the D/E 1330 may comprise dedicated hardware when it is available. Alternatively, D/E 1330 may comprise a software-driven decrypt/encrypt engine, e.g. OpenSSL, that may be implemented as a library with its own thread pool to perform decrypt/encrypt operations.

Figure 14A:
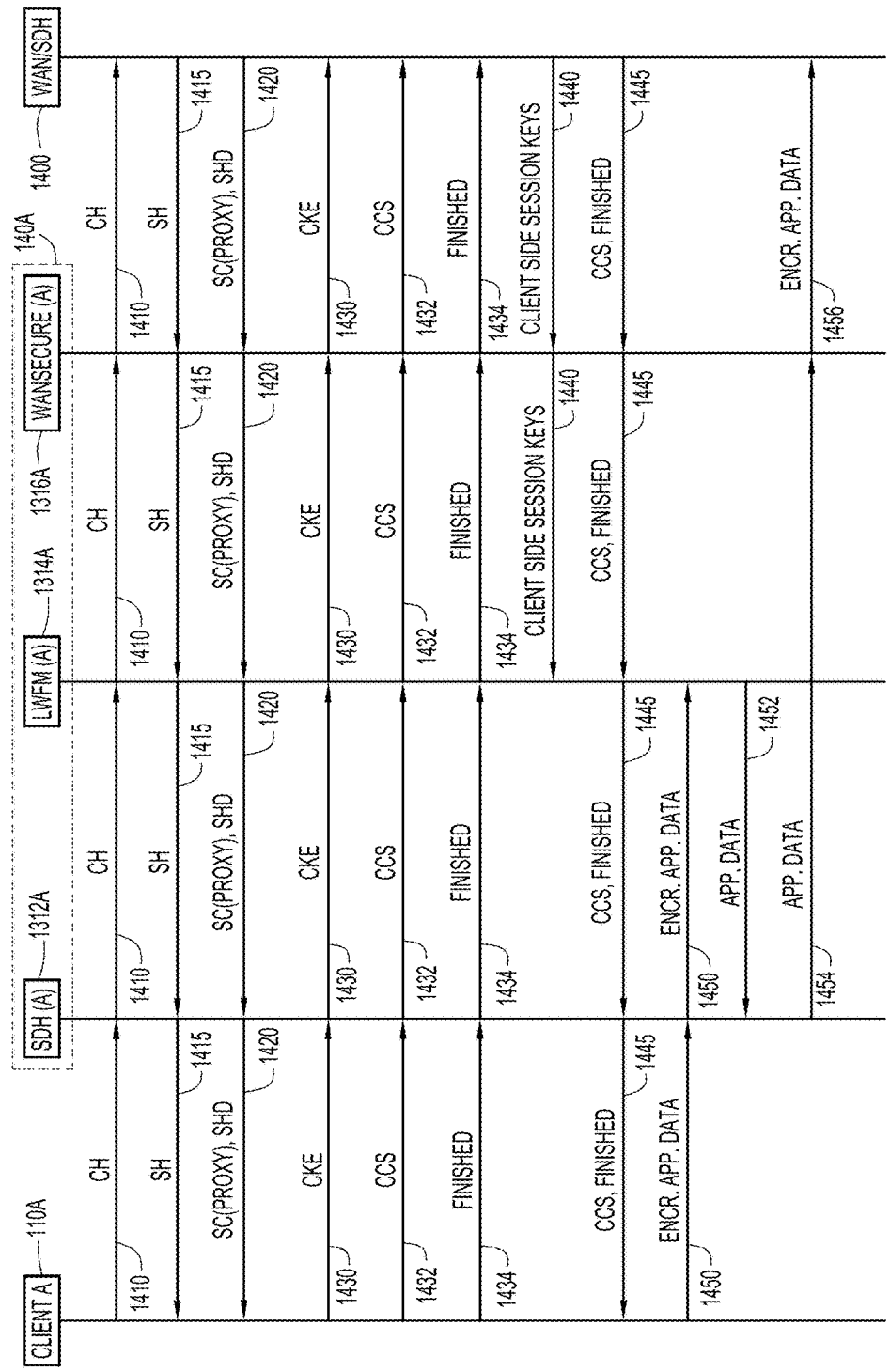
FIG. 14A is a ladder diagram showing steps on the client side in a session across an enterprise WAN secured with an SSL/TLS RSA security protocol according to an example embodiment.
Figure 14B:
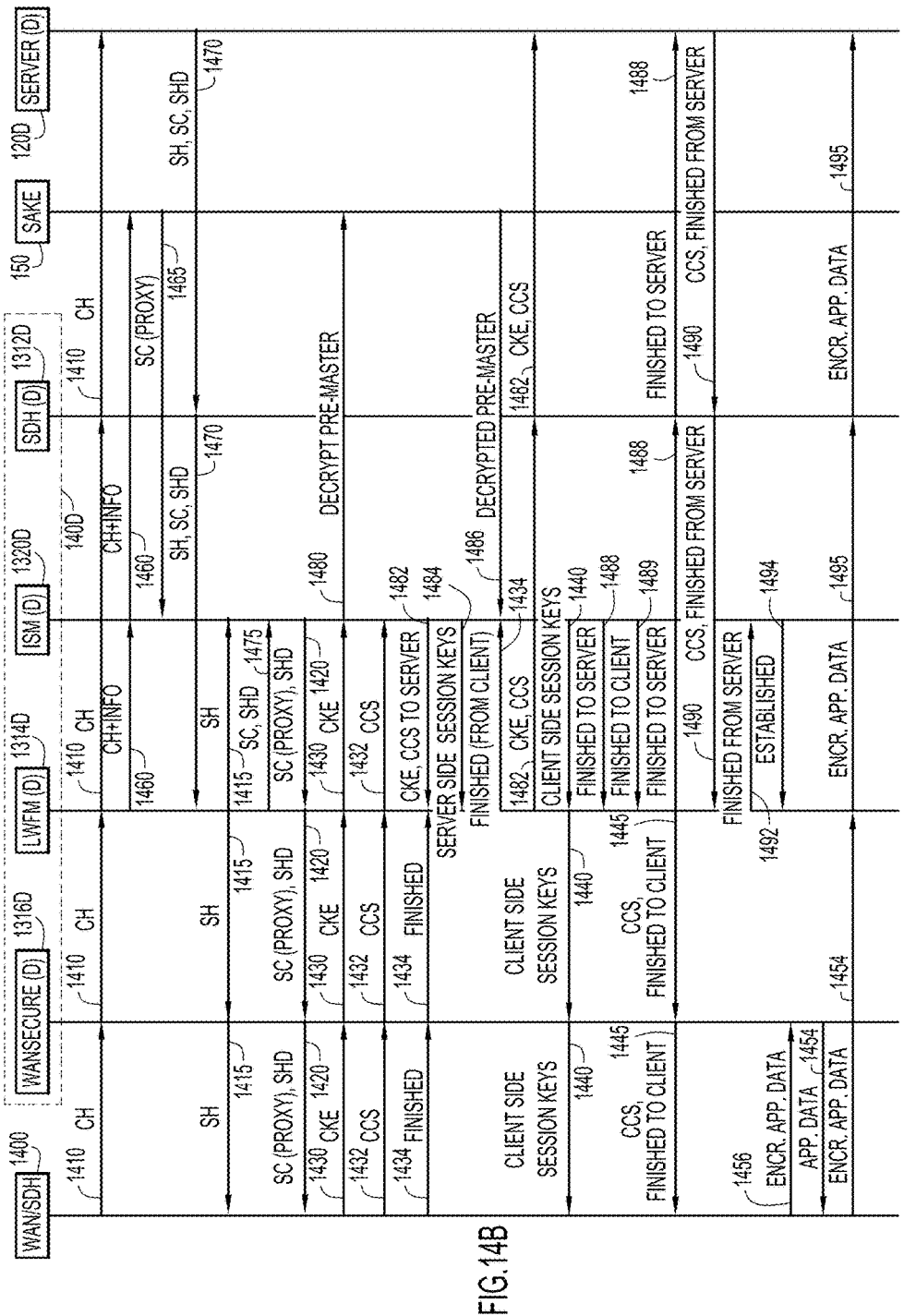
FIG. 14B is a ladder diagram showing steps on the server side in a session across an enterprise WAN secured with an SSL/TLS RSA security protocol according to an example embodiment.

In the example shown in FIGS. 14A and 14B, a client 110A communicates with server 120D through the network 130. As described with respect to FIG. 5, network element 140A is the closest network element to client 110A, and network element 140D is the closest network element to server 120D. For this example, the client 110A and the network element 140A will be referred to as the edge side of the session. In contrast, the server 120D and the network element 120D will be referred to as the core side of the session. The intermediate network elements 140B and 140C are not explicitly shown in FIGS. 14A and 14B, as they merely pass the messages along and do not interact with any messages in this example. The functionality of the intermediate network element is included abstractly through WAN/SDH 1400.

Referring now to FIG. 14A, a ladder diagram for the edge side of an RSA/SSL handshake for an active proxy interposer in an enterprise WAN is shown. Client 110A sends a CH message 1410 to the SDH 1312A of the closest network element 140A. The SDH 1312A forwards the CH message 1410 to the LWFM 1314A, which recognizes that the network element 140A is an edge device in this session and forwards the CH message 1410 to the WANSecure module 1316A. The WANSecure module 1316A sends the CH message 1410 to the core side of the session flow through WAN/SDH 1400. The WANSecure module 1316A receives a SH message 1415 from WAN/SDH 1400 and forwards it to the LWFM 1314A. The LWFM 1314A forwards the SH message 1415 to the client 110A via the SDH 1312A. The WANSecure module 1316A receives a message 1420 containing the proxy certificate of the server and the Server-Hello Done (SHD). These are forwarded to the client 110A via the LWFM 1314A and the SDH 1312A.

The client 110A sends a CKE message 1430, a CCS message 1432, and a Finished message 1434 to the SDH 1312A. These messages are forwarded to the LWFM 1314A, which forwards them to the WANSecure module 1316A. The WANSecure module 1316A sends these messages to the core side of the session flow through WAN/SDH 1400. The WANSecure module 1316A receives the client side session keys in message 1440, and forwards them to the LWFM 1314A. The LWFM 1314A stores the session keys in an appropriate data structure and connection state. The WANSecure module 1316A also receives CCS and Finished messages 1445 from the server through WAN/SDH 1400. Message 1445 is forwarded through the LWFM 1314A and the SDH 1312A to the client 110A.

The client 110A will begin the data phase by sending an encrypted application data message 1450 to the LWFM 1314A via the SDH 1312A. The LWFM 1314A uses the session keys it has for this session to decrypt message 1450 and generate decrypted message 1452. The decrypted message 1452 is forwarded to the SDH 1312A so that the SDH 1312A can forward it to the appropriate entity for the service function (e.g., Application Optimization (AO), connector, etc.). In one example, an upper layer entity sends a message to the client 110A, which will be forwarded to the LWFM 1314A by the SDH 1312A. The LWFM 1314A will encrypt these message using the stored session keys and forward the messages to the client 110A via the SDH 1312A. In another example, an upper layer entity generates a message 1454 for the server side, which SDH 1312A will forward to the WANSecure module 1316A. The WANSecure module 1316A will encrypt the message 1454 and generate an encrypted message 1456, which is sent to the core side through the WAN/SDH 1400.

Referring now to FIG. 14B, a ladder diagram for the core side of an RSA/SSL handshake for an active proxy interposer in an enterprise WAN is shown. The WANSecure module 1316D receives the CH message 1410 from the WAN/SDH 1400 and forwards it to the LWFM 1314D. The LWFM 1314D forwards the CH message 1410 to the server 120D via the SDH 1312D. The LWFM 1312D also makes a copy of the CH message and forwards the copy along with information (e.g., IP address, port number, Serer Host name, etc.) about the server 120D to the ISM 1320D in message 1460. The ISM 1320D sends the message 1460 to the SAKE 150. The message 1460 may request a new server certificate or it may request to validate a cached server certificate. The SAKE 150 responds to the ISM 1320D with message 1465 including a proxy server certificate for the server 120D. The server 120D responds to the LWFM 1314D (via the SDH 1312D) with message 1470 including a Server-Hello message, an actual server certificate (SC), and a Server-Hello Done (SHD) message. Message 1470 may arrive in a single TCP segment or across multiple TCP segments. The LWFM 1314D receives messages 1470 and forwards the SH message 1415 to the ISM 1320D and to the edge side of the session via the WANSecure module 1316D and WAN/SDH 1400. The LWFM 1314D will also forward the SC and SHD in message 1475 to the ISM 1320D.

The ISM 1320D compares the SC from the server 120D in message 1475 to the proxy SC from the SAKE 150 in message 1465. Since the SC are different in this example, the ISM 1320D proceeds in an active interposing mode. The ISM 1320D will verify the actual server SC from message 1475 using an authentication module (not shown). In the active interposing mode, the Ism 1320D will send message 1420 including the proxy SC and the SHD message to the LWFM 1314D. The LWFM 1314D will forward message 1420D to the edge side of the session through WANSecure module 1316D and WAN/SDH 1400.

The WANSecure module 1316D receives the CKE message 1430, which includes the Pre-Master secret from the client 110A, from edge side of the session via WAN/SDH 1400 and forwards it to the LWFM 1314D. The LWFM 1314D forwards message 1430 to the ISM 1320D. The ISM 1320D will send a message 1480 to the SAKE 150 requesting the SAKE 150 to decrypt the Pre-Master secret. The WANSecure module 1316D also receives the CCS message 1432 and the Finished message 1434 from the client 110A through the WAN/SDH 1400. The WANSecure module 1316D forward messages 1432 and 1434 to the ISM 1320D through the LWFM 1314D.

The ISM 1320D also generates a Pre-Master secret for use with the server side SSL session and encrypts it with the SC from message 1470. The ISM will generate a CKE message including the encrypted Pre-Master secret for the server 120D and a CCS message and send them to the LWFM 1314D in message 1482. The LWFM 1314D will forward message 1482 to the server 120D through the SDH 1312D. The ISM 1320D will send the server side session keys to the LWFM 1314D in message 1484D. Once the SAKE 150 has decrypted the client side Pre-Master secret, it sends the decrypted Pre-Master secret to the ISM 1320D in message 1486.

The ISM 1320D will verify the client's Finished message 1434 and send the client session keys to the LWFM 1314D in message 1440. The ISM 1320D also generates a Finished message 1488 to the server and a Finished message 1489 to the client, and sends the Finished messages 1488 and 1489 to the LWFM 1314D. The LWFM 1314D forwards the client session keys in message 1440, as well as the CCS message and the Finished message to the client in message 1445, to the edge side of the session through the WANSecure module 1316D and WAN/SDH 1400. The LWFM 1314D forwards the Finished message 1488 to the server 120D through the SDH 1312D.

The server 120D sends a CCS message and a Finished message from the server in message 1490. The SDH 1312D forwards message 1490 to the LWFM 1314D, which in turn forwards the Finished message from the server to the ISM 1320D in message 1492. Once the ISM 1320D verifies the Finished message 1492, the ISM 1320D informs the LWFM 1314D that the connection is established with message 1494, and the LWFM 1314D can provide encryption/decryption services to the session.

From the WAN/SDH 1400, the WANSecure module 1316D receives encrypted application data in message 1456, which is decrypted and provided to the LWFM 1314D in message 1454. The LWFM 1314D encrypts the application data from message 1454 with the server-interposer session keys and sends the encrypted application data 1495 to the server 120D through the SDH 1312D.

In one example, the ISM 1320D may not receive message 1465 containing the proxy SC. If, after a predetermined time, the ISM 1320D does not receive a SC from the SAKE 150, then the ISM 1320D will instruct the LWFM 1314D to push down this connection and will take no further part in this connection. The LWFM 1314D will push the connection down after sending the actual SC and SH message to the client, and will not process any further messages from this connection.

In summary, an interposer may interpose into an application security protocol by obtaining an application session security state. The interposer may obtain the session security state without holding any private keying material of the client or the server in the session. The solution maintains overall application security and enterprise network security. The interposer establishes a secure, trusted, and authorized communication with the SAKE, which aids the interposer in obtaining the application security protocol session state.

In one example, the techniques presented herein provide for a computer-implemented method in which a network device receives a session initiation message from a client device. The session initiation message comprises an address for a server to initiate a secure session between the client device and the server. The network device forwards the session initiation message to the server at the server address. The network device also forwards the session initiation message to a security assistant device that is physically located in a secure location apart from the network device. The network device receives a session authorization from the security assistant device, which enables the network device to decrypt messages from the secure session between the client device and the server.

In another example, the techniques presented herein provide for an apparatus with a network interface unit and a processor. The network interface unit is configured to send and receive communications over a network. The processor is configured to receive a session initiation message from the client device via the network interface unit. The session initiation message comprises a server address for a server to initiate a secure session between the client device and the server. The processor is also configured to cause the network interface to forward the session initiation message to the server at the server address. The processor is further configured to cause the network interface unit to forward the session initiation message to a security assistant device physically located separate from the apparatus. The processor is configured to receive a session authorization from the security assistant device via the network interface unit. The session authorization enables the apparatus to decrypt messages from the secure session between the client device and the server.

In yet another example, the techniques presented herein provide for a computer-implemented method comprising receiving a session initiation message from an interposer device at a physically separate location. The session initiation message initiates a secure session between a client device and a server. The method further comprises determining a certificate associated with the server and transmitting, to the interposer device, a session authorization based on the certificate associated with the server. The session authorization enables the interposer to decrypt the messages in the secure session.

The above description is intended by way of example only. Various modifications and structural changes may be made therein without departing from the scope of the concepts described herein and within the scope and range of equivalents of the claims.

What is claimed is:

1. A method comprising:
   at a network device, receiving a set of session initiation messages from a client device, the set of session initiation messages comprising an address for a server to initiate a handshake for a secure session between the client device and the server;
   forwarding the set of session initiation messages to the server at the server address;
   forwarding the set of session initiation messages to a security assistant device, the security assistant device physically located in a secure location apart from the network device;
   receiving a first session authorization, wherein the first session authorization is based on a first key stored on the server;
   determining whether the network device will act as an active interposer or as a transparent interposer;
   responsive to a determination that the network device will act as an active interposer, receiving a second session authorization from the security assistant device and transmitting the second session authorization to the client device, wherein the second session authorization is based on a second key stored on the security assistant device;
   responsive to a determination that the network device will act as a transparent interposer, transmitting to the client device the first session authorization;
   sending a portion of the handshake for the secure session to be processed by the security assistant device using the first key or the second key;
   receiving from the security assistant device, the portion of the handshake that has been processed by the first key or the second keys;
   receiving a plurality of secure messages from the secure session between the client device and the server;
   unwrapping the plurality of secure messages with the second session authorization received from the security assistant device to generate a plurality of unwrapped messages; and
   processing the unwrapped messages according to a network application based on contents of the unwrapped messages.

2. The method of claim 1, further comprising:
   responsive to a determination that the network device will act as an active interposer, transmitting the second session authentication to the client device.

3. The method of claim 1, further comprising:
   responsive to a determination that the network device will act as a transparent interposer, transmitting the first session authentication to the client device.

4. The method of claim 1, further comprising:
   modifying the unwrapped messages according to the network application to generate modified messages;
   wrapping the modified messages to generate modified secure messages; and
   transmitting the modified secure messages to the client device.

5. The method of claim 1, wherein the security assistant device negotiates the second session authorization with the server on behalf of the network device.

6. The method of claim 1, wherein the secure session is secured via one of Secure Sockets Layer (SSL) Transport Layer Security (TLS), Datagram Transport Layer Security (DTLS), Microsoft Kerberos (MS-KRB), or Microsoft NT LAN Management (MS-NTLM).

7. The method of claim 1, wherein the network device and the security assistant device communicate via a secure back channel.

8. The method of claim 7, further comprising provisioning the network device via the secure back channel with an authorization to provide security services.

9. The method of claim 8, further comprising invalidating the authorization to provide security services.

10. The method of claim 1, further comprising:
    computing a hash of at least a part of the set of session initiation messages;
    generating a handshake finish message including the hash; and
    transmitting the handshake finish message to at least one of the client or the server.

11. An apparatus comprising:
    a network interface unit that sends and receives communications over a network; and a processor coupled to the network interface unit, to:
  receive a set of session initiation messages from a client device via the network interface unit, the set of session initiation messages comprising a server address for a server to initiate a handshake for a secure session between the client device and the server;
  cause the network interface unit to forward the set of session initiation messages to the server at the server address;
  cause the network interface unit to forward the set of session initiation messages to a security assistant device physically located separate from the apparatus;
  receive a first session authorization from the server, wherein the first session authorization is based on a first key stored on the server;
  determining whether the apparatus will act as an active interposer or as a transparent interposer;
  responsive to a determination that the apparatus will act as an active interposer, receive a second session authorization from the security assistant device via the network interface unit and cause the network interface unit to transmit the second session authorization to the client device, wherein the second session authorization is based on a second key stored on the security assistant device;
  responsive to a determination that the apparatus will act as a transparent interposer, cause the network interface unit to transmit to the client device the first session authorization;
  cause the network interface unit to send a portion of the handshake for the secure session to be processed by the security assistant device using the first key or the second key; and
  receive from the security assistant device, via the network interface unit, the portion of the handshake that has been processed by the first key or the second keys;
  receive, via the network interface unit, a plurality of secure messages from the secure session between the client device and the server;
  unwrap the plurality of secure messages with the second session authorization received from the security assistant device to generate a plurality of unwrapped messages; and
  process the unwrapped messages according to a network application based on contents of the unwrapped messages.

12. The apparatus of claim 11, wherein the processor further:
  responsive to a determination that the apparatus is to act as an active interposer, causes the network interface unit to transmit the second session authentication to the client device.

13. The apparatus of claim 11, wherein the processor further:
  responsive to a determination that the apparatus is to act as a transparent interposer, causes the network interface unit to transmit the first session authentication to the client device.

14. The apparatus of claim 11, wherein the processor further:
  modifies the unwrapped messages according to the network application to generate modified messages;
  wraps the modified messages to generate modified secured messages; and
  causes the network interface unit to transmit the modified secure messages to the client device.

15. The apparatus of claim 11, wherein the secure session is secured via one of Secure Sockets Layer (SSL) Transport Layer Security (TLS), Datagram Transport Layer Security (DTLS), Microsoft Kerberos (MS-KRB), or Microsoft NT LAN Management (MS-NTLM).

16. The apparatus of claim 11, wherein the network interface communicates with the security assistant device via a secure back channel.

17. The apparatus of claim 16, wherein the processor is provisioned via the secure back channel with an authorization to provide security services.

18. The apparatus of claim 17, wherein the processor receives, via the network interface, an invalidation message that invalidates the authorization to provide security services.

19. The apparatus of claim 11, wherein the processor further:
  computes a hash of at least a part of the set of session initiation messages;
  generates a handshake finish message including the hash; and
  causes the network interface to transmit the handshake finish message to at least one of the client or the server.

* * * * *

UNITED STATES PATENT AND TRADEMARK OFFICE
CERTIFICATE OF CORRECTION

PATENT NO. : 10,178,181 B2
APPLICATION NO. : 14/328094
DATED : January 8, 2019
INVENTOR(S) : Eitan Ben-Nun et al.

It is certified that error appears in the above-identified patent and that said Letters Patent is hereby corrected as shown below:

In the Claims

Claim 1, Column 32, Line 16, please replace "keys;" with --key;--

Claim 11, Column 33, Line 39, please replace "keys;" with --key;--

Signed and Sealed this
Twenty-sixth Day of February, 2019

Andrei Iancu
*Director of the United States Patent and Trademark Office*